US010347293B1

United States Patent
Skinner et al.

(10) Patent No.: US 10,347,293 B1
(45) Date of Patent: Jul. 9, 2019

(54) DETECTING, REDACTING, AND SCORING CONFIDENTIAL INFORMATION IN VIDEO

(71) Applicant: Droplr, Inc., Bend, OR (US)

(72) Inventors: Gray Skinner, Bend, OR (US); Levi Nunnink, Bend, OR (US)

(73) Assignee: Droplr, Inc., Bend, OR (US)

(*) Notice: Subject to any disclaimer, the term of this patent is extended or adjusted under 35 U.S.C. 154(b) by 0 days.

(21) Appl. No.: 16/050,071

(22) Filed: Jul. 31, 2018

(51) Int. Cl.
| *G06F 15/16* | (2006.01) |
| *G11B 27/031* | (2006.01) |
| *G06K 9/00* | (2006.01) |
| *G06K 9/62* | (2006.01) |
| *G06F 17/27* | (2006.01) |
| *G06F 3/14* | (2006.01) |

(52) U.S. Cl.
CPC .......... *G11B 27/031* (2013.01); *G06F 3/1462* (2013.01); *G06F 17/277* (2013.01); *G06K 9/00718* (2013.01); *G06K 9/6202* (2013.01); *G06K 9/6284* (2013.01); *G06K 2209/01* (2013.01)

(58) Field of Classification Search
CPC ........ G06F 16/435; G06F 16/48; G06F 21/10; G06F 2221/032; G06F 2221/0724; G06F 17/277; G06F 3/1462; G11B 27/031; G06K 9/00718; G06K 9/6202
USPC ........ 386/240, 244, 230, 287; 709/231, 232, 709/236, 230; 382/180, 176; 725/38
See application file for complete search history.

(56) References Cited

U.S. PATENT DOCUMENTS

| 9,239,961 | B1* | 1/2016 | Cole | G06K 9/00456 |
| 2005/0008221 | A1* | 1/2005 | Hull | G06F 17/212 382/161 |
| 2006/0204096 | A1* | 9/2006 | Takebe | G06K 9/00463 382/180 |
| 2007/0030528 | A1 | 2/2007 | Quaeler et al. | |
| 2008/0175377 | A1 | 7/2008 | Merrill | |
| 2008/0204788 | A1 | 8/2008 | Kelly et al. | |
| 2010/0005417 | A1* | 1/2010 | Lanahan | G06F 3/0481 715/815 |
| 2010/0097662 | A1 | 4/2010 | Churilla | |
| 2010/0322373 | A1 | 12/2010 | Churilla | |
| 2012/0173750 | A1* | 7/2012 | Rakshit | H04L 29/06027 709/231 |
| 2012/0265762 | A1 | 10/2012 | Wade et al. | |
| 2013/0117464 | A1* | 5/2013 | Brown | H04L 12/1827 709/232 |
| 2014/0123237 | A1 | 5/2014 | Gaudet et al. | |

(Continued)

OTHER PUBLICATIONS

Kotsarenko, et al., "Measuring perceived color difference using YIQ NTSC transmission color space in mobile applications," Programación Matemática y Software (2010), vol. 2. No. 2. ISSN: 2007-3283.

(Continued)

*Primary Examiner* — Helen Shibru
(74) *Attorney, Agent, or Firm* — Pillsbury Winthrop Shaw Pittman LLP

(57) ABSTRACT

Provided is a process, including: obtaining screen-cast video; determining amounts of difference between respective frames; selecting a subset of frames based on the amounts; causing OCRing of each frame in the subset of frames; classifying text in each frame-OCR record as confidential or non-confidential; and forming a redacted version of the screen-cast video based on the classifying.

22 Claims, 7 Drawing Sheets

(56) References Cited

U.S. PATENT DOCUMENTS

| | | |
|---|---|---|
| 2014/0278366 A1 | 9/2014 | Jacob et al. |
| 2014/0281871 A1 | 9/2014 | Brunner et al. |
| 2015/0055867 A1 | 2/2015 | Wade et al. |
| 2015/0163485 A1* | 6/2015 | Lin ........................ H04N 19/52 375/240.16 |
| 2016/0094868 A1* | 3/2016 | Singhal ............ H04N 21/44008 725/38 |
| 2016/0378790 A1* | 12/2016 | Besehanic ................ G06F 16/50 707/706 |
| 2017/0126652 A1 | 5/2017 | Gaudet et al. |
| 2017/0308528 A1 | 10/2017 | Wade et al. |

OTHER PUBLICATIONS

Vysniauskas, V., "Anit-alias Pixel Intensity Slope Detector," Elektronika ir Elektrotechnika, Oct. 2009.

Sah, et al., "Video redaction: a survey and comparison of enabling technologies," J. of Electronic Imaging, 26(5) 051406 (2017), downloaded from: https://www.spiedigitallibrary.org/journals/journal-of-electronic-imaging/volume-26/issue-05/051406/Video-redaction-a-survey-and-comparison-of-enabling-technologies/ [downloaded on Nov. 13, 2018].

U.S. Appl. No. 16/050,219, filed Jul. 31, 2018.

* cited by examiner

DETECTING, REDACTING, AND SCORING CONFIDENTIAL INFORMATION IN VIDEO

CROSS-REFERENCE TO RELATED APPLICATIONS

No cross-reference is presented.

BACKGROUND

1. Field

The present disclosure relates generally to distributed computing and, more specifically, to detecting, redacting, and scoring confidential information in video.

2. Description of the Related Art

Screen-content sharing applications take a variety of forms. In some cases, users may share their desktop on a video chatting application with another user. In other cases, a user may grab screenshots of their screen display and upload those screenshots for sharing with others. Some applications support window-specific screenshots of just the interface of that application. In some cases, the screenshot is of the entire display or a subset thereof, for example, a given application being displayed. In some cases, the screen-content sharing applications offer screen-content sharing as a more tangential feature to a larger suite of tools, such as task management applications, chat applications, productivity explications, and the like.

SUMMARY

The following is a non-exhaustive listing of some aspects of the present techniques. These and other aspects are described in the following disclosure.

Some aspects include a process, including obtaining, with one or more processors, screen-cast video of a display of a first user computing device captured by a screen-cast-capable client application executing on the first user computing device, the video comprising a plurality of frames in a sequence of frames, each frame depicting an image of the display at a corresponding time; determining, with one or more processors, amounts of difference between respective frames and one or more frames that precede respective frames; selecting, with one or more processors, a subset of frames from among the plurality of frames based on the subset of frames each having greater than a threshold amount of difference relative to one or more respective preceding frames; associating, with one or more processors, with each frame in the subset of frames, respective indications of durations of time until a respective subsequent selected frame in the subset of frames; causing, in response to the selection, with one or more processors, optical character recognition (OCRing) of each frame in the subset of frames and obtaining corresponding frame-OCR records, each frame-OCR record including text determined by the OCRing to be depicted in a corresponding frame and bounding areas determined by the OCRing indicating display coordinates of pixels depicting the text in the corresponding frame; classifying, with one or more processors, text in each frame-OCR record as confidential or non-confidential; and forming, with one or more processors, a redacted version of the screen-cast video by, for each frame having text classified as confidential: determining bounding areas of the text classified as confidential based on the frame-OCR record corresponding to the respective frame having text classified as confidential; determining a subsequence of frames within the duration of time associated with the respective frame having text classified as confidential; and modifying, based on the determined bounding areas and the determined subsequence, pixel values in the bounding areas for each of the frames in the subsequence to redact the text classified as confidential in the respective frame and the subsequence of frames; and storing, with one or more processors, the redacted version of the screen-cast video in memory.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
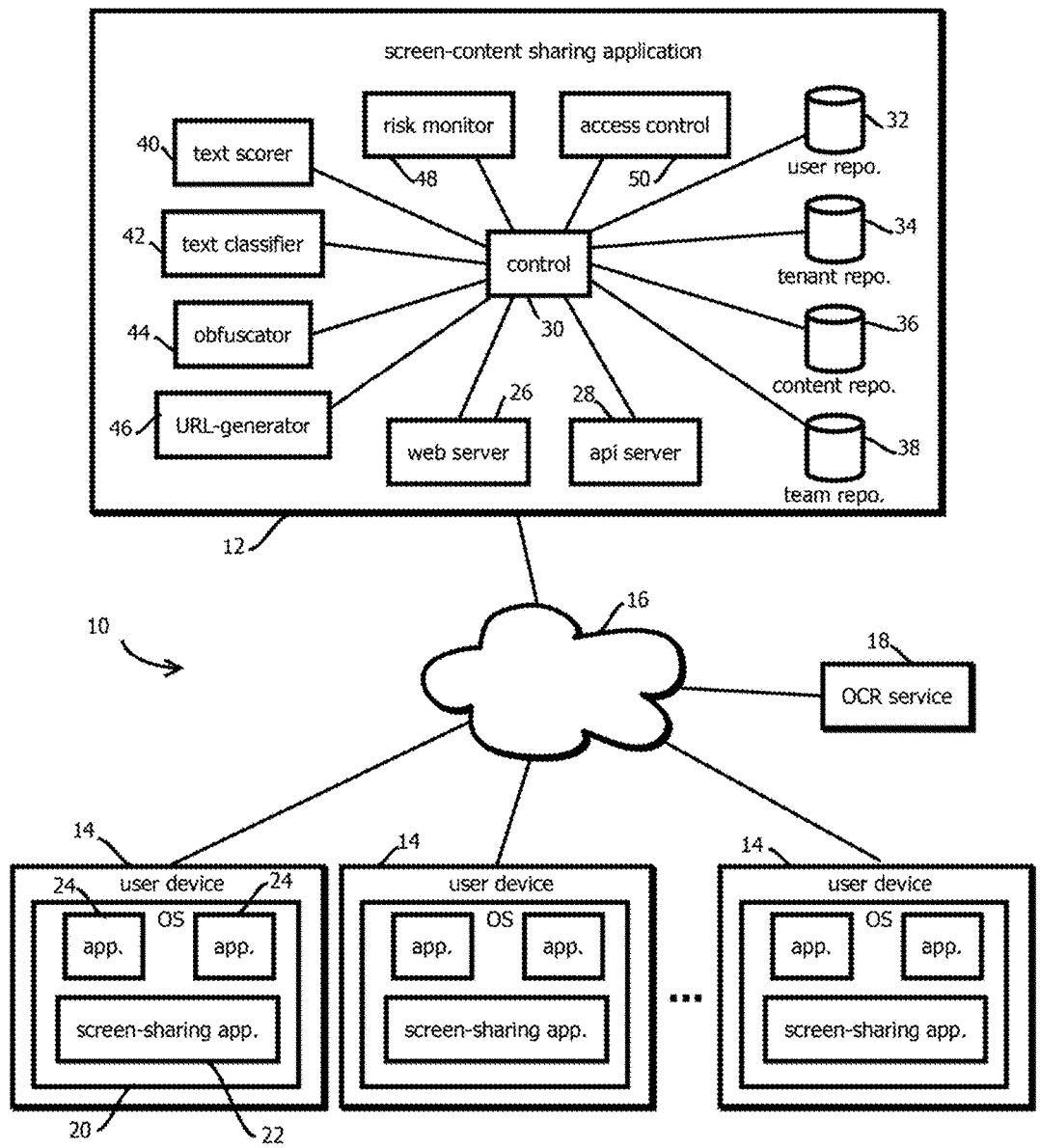
FIG. 1 is a block diagram showing a logical and physical architecture of an example of a screen-content sharing application in accordance with some embodiments of the present techniques.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the fields of cybersecurity and image processing. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Existing screen-content sharing applications often fail to address the security needs of enterprise users. In many cases, information technology professionals managing enterprise networks go to great lengths to secure information on their network, e.g., in proprietary databases and in confidential documents. Often, enterprises host information that is required by law to be kept confidential, and in many cases, organizations have information in their networks that they wish to remain confidential for trade secret purposes or because that information confers other competitive advantages. Many screen-content sharing applications, while enormously helpful for productivity of a workforce, potentially leak information from these networks, e.g., if confidential information is displayed on a user's device when they capture content to share, for instance, with the screenshot or by sharing a video screen cast of their display as they interact with an application. In some cases, this sharing is inadvertently leaking confidential information, or in some cases malicious actors may seek to exfiltrate confidential information through screen content sharing.

Traditional techniques to detect confidential information leaving a network are often not well-suited for screen-content sharing applications. Many traditional techniques rely on processing of text encoded as such in documents (e.g., in Unicode format or ASCII format). For example, some existing techniques analyze the text of emails to determine whether the email is conveying confidential information to a user outside the network, or other examples process the text of documents attached to emails. These techniques, however, often fail when the text is depicted in an image. In many cases, the images are encoded as bitmaps, which may include or specify a matrix of pixel intensity values by which the image is formed. These pixel intensity values, in and of themselves, generally do not explicitly encode text, and as such, can often pass traditional types of filtering. Indeed, the inability of programs to process many types of images having text is the basis for distinguishing between humans and computers with CAPTCHAs.

Existing techniques for classifying text in documents are not well suited for screen-content sharing application use cases. In many cases, the techniques impose a larger draw on computational resources that is desirable, and in many cases, the techniques fail to account for organization-specific needs in which similar types of information may be handed differently. Further, existing techniques are often not well suited for nuances in the way the content is shared, e.g., failing to account for instances professionals need to communicate for legitimate reasons with relatively low friction, even if they communication involves images with confidential information in a portion of the image. Finally, there is a need in some use cases to monitor risk related to use of these applications, as individual sharing instances may not reveal patterns of behavior that, in the aggregate, warrant concern.

FIG. 1 through four depict examples of aspects of a set of techniques by which confidential and other types of information in bitmap images shared with a content-sharing application may be detected, redacted, or scored for risk in accordance with some embodiments. To this end, some embodiments:

1. Run the bitmap image through an optical character recognition (OCR) algorithm to extract text and word bounding boxes;
2. Analyze the string results by:
   a. Using pattern matching detect emails, credit card numbers, social security numbers, phone number, addresses, and the like, and
   b. Using natural language processing, detect proper nouns;
3. Apply a redaction filter to the regions of the image where embodiments detect a positive match; and
4. Calculate a numerical risk score for the image, in some cases normalizing the score based on a NumberOfMatches/NumberOfWords or based on a SUM(BoundaryBoxOfMatches)/image width*height.

Figure 3:
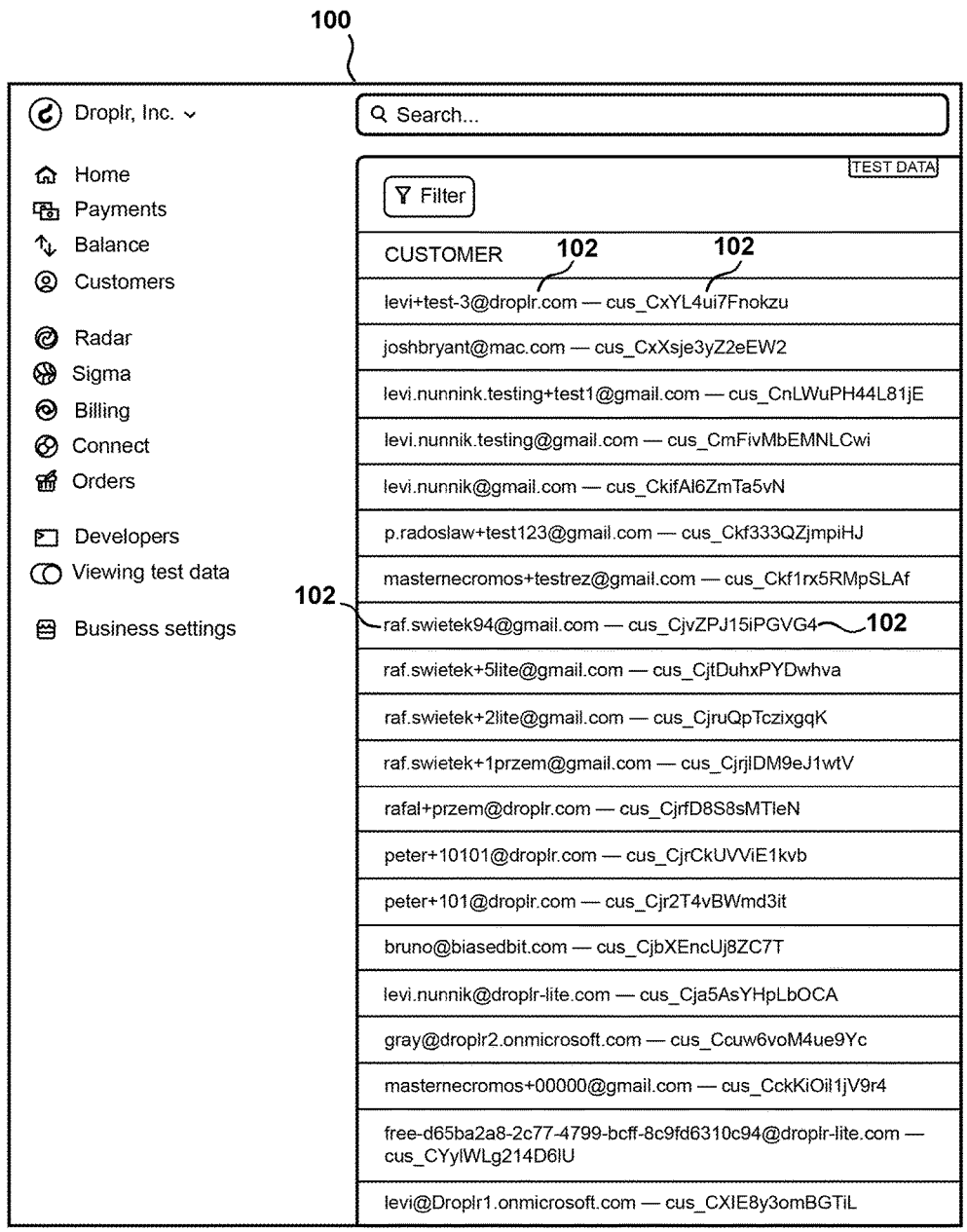
FIGS. 3 and 4 are examples of screenshots before and after redacting in accordance with some embodiments of the present techniques.
Figure 4:
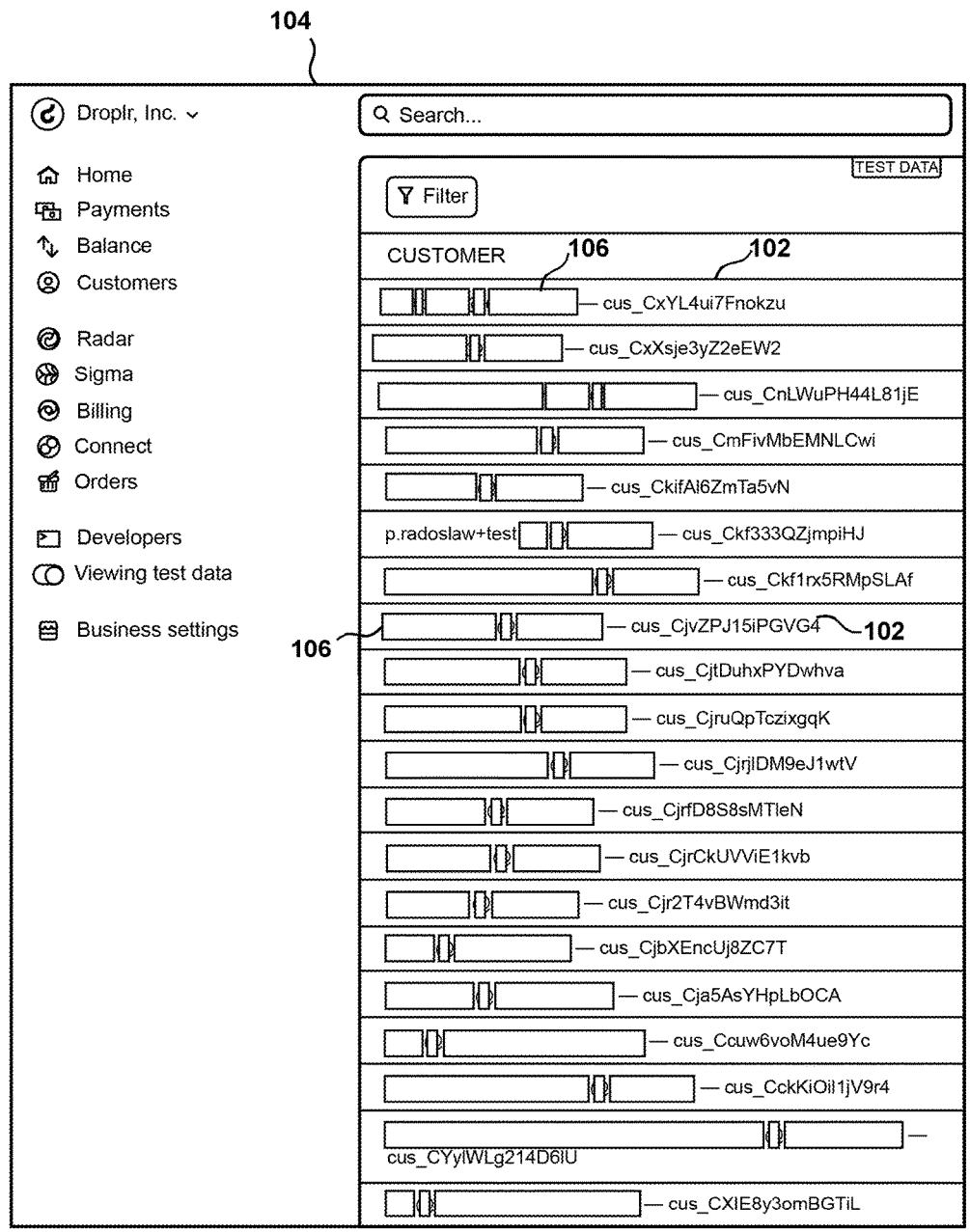
Figure 5:
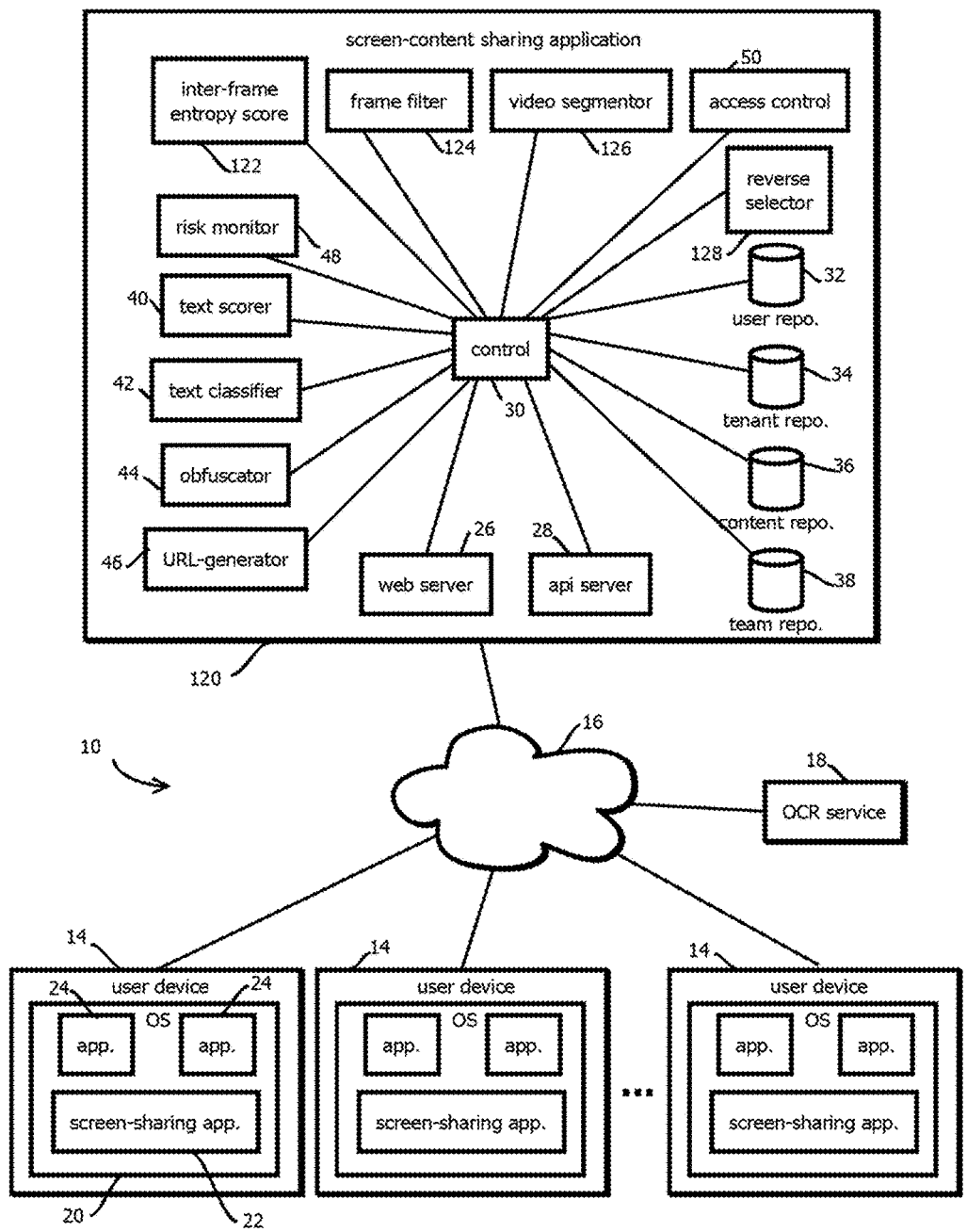
FIG. 5 is a block diagram showing a logical and physical architecture of an example of another screen-content sharing application configured to redact confidential information in video in accordance with some embodiments of the present techniques.
Figure 6:
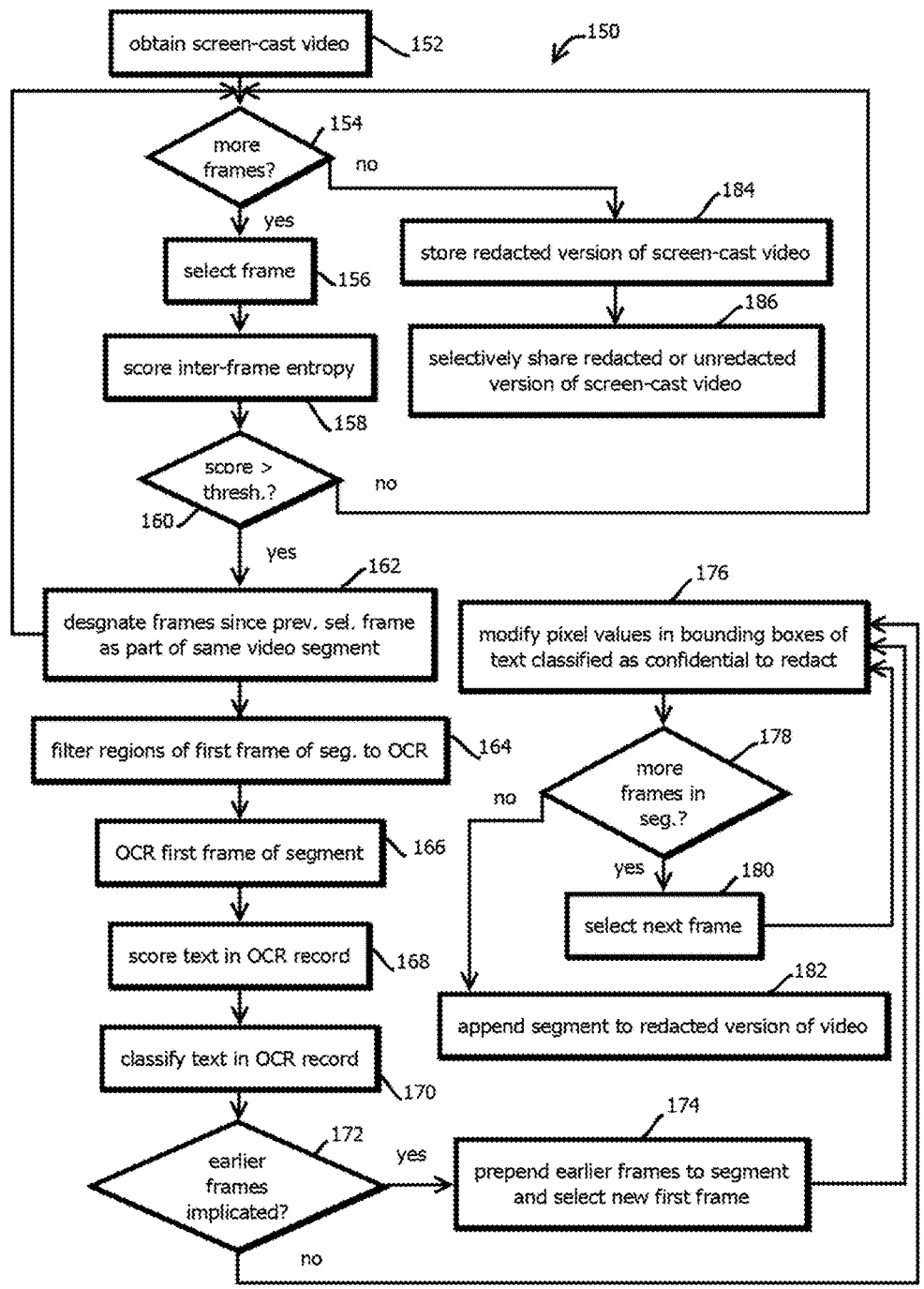
FIG. 6 is a flowchart of an example of a process to redact confidential information in video shared by a screen-content sharing application in accordance with some embodiments of the present techniques.

FIGS. 5 and 6 depict aspects of another set of complementary techniques by which video may be processed to similar ends, in some cases drawing upon the techniques of FIGS. 1 through 4, but with a significantly lower computational load than naïve application of these techniques to video would be expected to generate. To this end, some embodiments perform the following operations:

1. Break apart video into frames;
2. Build an array of significantly unique frames by detecting changes in (algorithmically inferred) perceived color differences and applying anti-alias detection to ignore superficial differences, e.g., by filtering out differences of less than 80% of the previous image to avoid reacting to differences like a mouse moving across the screen. Each unique image may then be associated with a time-range for redaction purposes.
3. Run each significantly unique frame through the above-noted analysis and redaction algorithm;
4. Calculate a risk score as the sum of each frame score; and
5. For each detected bit of confidential information (e.g., personally identifiable information, insider information, information subject to HIPPA, etc.), apply a redaction filter to the video for the associated time frame.

Some embodiments may implement techniques to expedite the processing of video frames, for instance, by selectively processing a subset of the video frames exhibiting greater than a threshold amount of entropy relative to the preceding frame or frames, and in some cases selectively processing subsets of video frames by filtering out those portions of images predicted to be unlikely to have text containing confidential information (e.g., toolbars or whitespace).

In some embodiments, some or all of the above-mentioned techniques may be implemented in a computing environment 10 shown in FIG. 1. In some embodiments, the computing environment 10 may include a plurality of user computing devices 14, a screen-content sharing application 12, one or more networks 16 by which these components communicate (such as the Internet), and an OCR service 18 configured to perform optical character recognition on bitmap images sent to the OCR service 18.

Three user computing devices 14 are shown, but commercial embodiments are expected to include substantially more, such as more than 10,000, more than 100,000, or more than 1 million different user computing devices 14, in some cases geographically distributed over an area larger than 1000 km$^2$, 10,000 km$^2$, North America, or the world. In some embodiments, each of the user computing devices 14 may be used by a different user having a different user account in the screen-content sharing application 12. Or some users may access the same account with different devices. In some cases, subsets of the user devices may operate on secure local area networks through which they access the application 12 or the Internet. The user computing devices 14 may be various kinds of computing devices, such as desktop computers, laptop computers, set-top boxes, tablet computers, smart phones, in-automotive computing devices, in-store kiosks, and the like.

In some embodiments, the user computing devices 14 may each execute an instance of an operating system 20 and a screen-sharing client application 22, along with various applications 24, which may execute in the operating system 20. In some cases, the applications 24 present a user interface on a display of the user computing device, e.g., in a "window," and the screen-sharing application 22 may capture screenshots or screen casts video of the state of that display including that user interface for sharing via the server-side screen-content sharing application 12 with other user computing devices 14. Collectively the components 22 and 12 form a distributed screen-content sharing application, but this term is used to refer to the distributed application and the server side and client side components interchangeably unless indicated otherwise. The applications 24 may be various types of applications, including web browsers, email clients, productivity applications, and the like. The screen-sharing application 22 may be a native application installed on the user computing device 14, for instance, during part of a registration process with the server-side screen-content sharing application 12 by which user credentials are selected or otherwise assigned and stored in memory of the screen-sharing application 22 in a user account. Some embodiments may include in communications between the components 12 and 14 identifiers of such an account so that shared content or access requests may be organized by account.

In some embodiments, the client-side screen-sharing application 22 registers with the operating system 20 to receive various types of events, such as file creation events or other invents indicating that a screen capture or screen cast video display of the display presented by the operating system 20 is occurring. Some embodiments may execute an event handler that responds to these events to effectuate the functionality described herein. In some cases, these events may include a reference to or copy of a bitmap image or sequence of bitmap images in a video that may be accessed by the screen-sharing application 22 for purposes of subsequent operations described below. In some cases, the screen capture screen cast is caused by the screen-sharing application 22, for instance, responsive to user input to the application requesting the sharing or casting. In some embodiments, the screen-sharing application 22 queries a window manager of the operating system 20 responsive to such an event to obtain bounding boxes of windows of the various applications 24 and associates with those bounding boxes identifiers of the application. In some embodiments, this information may be reported along with the captured image or video to facilitate subsequent classification of content in the bounding boxes, using the application identifier as an additional feature for pattern matching.

In some embodiments, captured images or video may be redacted to form versions without confidential information. Forming a new version, modifying, redacting, or otherwise obfuscating may be performed by modifying values in memory encoding an existing version, for instance, changing bytes in a data structure in memory at addresses storing the existing version or by creating a new copy with the changed values. Reference to a "bitmap image" or "frame" singular includes reference to the various versions along a processing pipeline, including where the different versions exist as different copies with different processing or other transformations applied thereto or where a single copy has a subset of its values changed through such processing or transformation. Techniques related to video processing are described in greater detail with reference to FIGS. 5 and 6. To illustrate these and other techniques, FIGS. 1 through 4 are described with reference to redaction of images, and those techniques may be applied to individual frames as described below with reference to FIGS. 5 and 6.

In some embodiments, the image (or video) may be sent to the screen-content sharing application 12 via the Internet 16 along with an account identifier by the screen-sharing application 22 for redaction and sharing. Or in some cases, any subset of the presently described steps of the redaction process may be offloaded to the screen-sharing application 22 for client-side processing to keep confidential information within a network, or some embodiments may execute a on-premises instance of the screen-content sharing application or a set of services related to redaction and classification and risk monitoring on-premises on remote hardware that is distinct from that hosting the screen-content sharing application 12 and the user computing devices 14.

In some embodiments, the screen-content sharing application 12 includes a Web server 26 through which web requests are serviced, an application program interface server 28 through which API requests are serviced, a controller 30, a user account repository 32, a tenant account repository 34, a content repository 36, a team repository 38, a text scoring module 40, a text classifier 42, an obfuscator module 44, a URL generator 46, a risk monitor 48, and an access control module 50. In some embodiments, the control module 30 may control the operation of these other components, in some cases directing them to perform the processes described below with reference to FIG. 2 or 6 to produce user interfaces like those described below with reference to FIG. 3 or 4. A single instance of the various modules are shown, but embodiments are consistent with scalable architectures in which multiple instances of each module may be instantiated, for instance, behind load balancers in implementations designed to dynamically scale the number of instances responsive to computing load to concurrently process sessions. Further, in some cases, content may be offloaded to a content delivery network in accordance with the techniques described herein. Sending instructions to retrieve content from a content delivery network is an example of sending content as that and related phrase and related terms are used herein.

Some embodiments include software as a service implementations in which different entities, such as different enterprises, have different tenant accounts hosted by the same computing instances providing the server-side screen-content sharing application 12. In some cases, the server-side application may be implemented as a distributed application, for instance, a micro services application, in which different virtual machines or containers instantiate the different illustrated modules. Some embodiments may implement the illustrated functionality with a serverless architecture, for instance, in which the different modules are exposed as lambda functions.

In some embodiments, the web server 26 and the API server 28 are nonblocking servers configured to service a relatively high volume of traffic, such as more than one session per second, 10 sessions per second, 100 sessions per second, or 1000 sessions per second or operating concurrently. In some cases, the web server 26 may host dynamic webpages by which screen captures are viewed, shared, modified, commented on, or otherwise interacted with on user computing devices in web browsers. In some embodiments, the API server 28 may interact with the screen-sharing application 22 to upload screen captures or video or otherwise expose functionality of the server side screen-content sharing application via an API. In some embodiments, the API server 28 may expose the functionality described herein independent of the client application 22. For instance, in some cases, images (such as screen shots or frames of video) sent between client applications and various network accessible services (like chat services, social networking services, document repositories, email, etc.) may be routed through the application 12. For instance, images may be intercepted (e.g., by a firewall or browser extension) or client applications may be configured to provide images that the user requests to be uploaded to the API server 28. The API server may, in turn, cause the control module 30 to effectuate a redaction like those described herein. The modified images (or links thereto) may then be provided to the third party service to which the user requests the upload, thereby preventing the third party service from accessing confidential information, in some cases transparently to (e.g., without changing the tooling used by or experience of) the end user and third party service provider.

In some embodiments, the user repository 32 may store user account records. In some embodiments, each user account record may include a user identifier, user credentials by which a user is authenticated (such as a salted cryptographic hash of a user password), user account configuration settings, identifiers of current sessions under the user account, and references to records in the other repositories, such as teams including the user, tenants including those teams or tenants for which the user is an employee, content uploaded by the user, or content to which the user has access.

In some embodiments, uploaded content, like shared files, screen captures, or screen casts, may be organized into collections of such content, for instance, collections having thumbnails of such content arrayed visually in a grid, and users may select those thumbnails to access the content that corresponds to the thumbnail. In some embodiments, these collections may be referred to as "boards," and various users may each have a plurality of boards. In some embodiments, users may upload content to the boards, share the boards, delete the boards, or otherwise allocate access collectively to content in a board to other users. In some embodiments, teams may have boards or tenants may have boards as well, and users with access to all content corresponding to these entities may have access to those boards and content therein. In some embodiments, the boards may be characterized as feeds in which content is organized by date in which it was uploaded. Some embodiments may implement a publish-subscribe model by which users may publish to a channel formed by one of these boards and other users may subscribe to that channel to receive updates indicating changes in content therein.

Some embodiments may maintain a tenant repository 34, for instance, in a SaaS implementation in which different enterprise entities have content hosted on the screen-content sharing application, and those different enterprise entities each have their own respective tenant account. Each tenant account may have a tenant account record in the repository 34, which in some cases may include a list of authorized users and associated roles and permissions to access content and change the tenant account. Some embodiments of a tenant record may further include an inventory of boards associated with the tenant and teams associated with the tenant, corresponding to records in the other repositories 36 and 38. The repositories are described as distinct, but they may be intermingled, subdivided, or otherwise differently arranged, which is not to suggest that other features may not also be varied.

In some embodiments, the tenant records may further include policies that specify who can share information with who and which information is to be redacted or otherwise obfuscated from shared content. In some embodiments, these policies may map various sets of patterns to various teams or users, or the same set of patterns may be applied to all users of a tenant account. The patterns may indicate which subsets of shared content is to be redacted or otherwise obfuscated. In some embodiments, the indication is a white list indication in which content that matches the pattern is not redacted. In some embodiments, the indication is a blacklist indication in which content that matches the pattern is redacted.

Patterns may match to various types of content. In some embodiments, the patterns matched to non-text images, like faces, images of objects, images of rooms, images of maps, images of schematics, images of CAD files, and the like. In some embodiments, the patterns include object detection and localization models, such convolution neural networks trained on labeled training sets including examples of images with labels identifying objects to be detected. In some embodiments, such models may be trained by executing a stochastic gradient descent on the training set, or subset thereof.

In some embodiments, the patterns may match to text depicted in shared images. As noted above, bitmap images generally do not explicitly encode text as such, but rather represent content as a collection of pixels having pixel coordinates, like horizontal and vertical coordinates in an image (referred to as image-space herein), and pixel intensity values, such as values indicating intensity of various subpixels, like a red subpixel, blue subpixel, and green subpixel, or pixels may be expressed in other colorspaces that are not directly tied to the physical architecture of the pixels, like YPbPr or xvYCC, or HSV. In some embodiments, bitmap images may be encoded in a compressed encoding format, for instance, JPEG, PNG, and the like. Or in some cases, bitmap images may be encoded in a non-compressed format. A bitmap image need to be encoded in BMP format to constitute a bitmap image.

Accordingly, some embodiments may cause bitmap images to be sent to the OCR service 18, which may return an OCR record for the image indicating in a text format text appearing in the image and the location of that text in the image. In some embodiments, OCR records may indicate a bounding box of text specified with pixel coordinates of a bounding box in the image and a text encoded representation of the depicted text, like a string appearing in that bounding box, e.g., indicating the text "hello world" appears in bounding box "1, 1; 1, 50; 200; 1; 200, 50." Or some embodiments may indicate the area corresponding to depicted text by specifying other shapes or specifying a box in other ways, like indicating a bottom left corner and width, and implicitly specifying a height by identifying the bottom left corner of a line above. In some embodiments, OCR records may be returned in a hierarchical data serialization format, like extensible markup language (XML) or JavaScript™ object notation (JSON).

In some embodiments, patterns may match to individual tokens appearing in the text, such as sequences of characters delimited from other sequences of characters, for instance, by white space characters like space, period, end of line, and the like. In some embodiments, patterns may match to sequences of such tokens, like n-grams ranging from individual tokens corresponding to n equals one up to five consecutive tokens (i.e. n=5) or more.

In some embodiments, patterns may match exactly to one and only one string or some patterns may matched to a class of strings that are specified by the pattern. For instance, some patterns may require certain characters or tokens while allowing other characters or tokens to vary, for instance, by specifying wildcard characters or tokens. Some embodiments may filter out or allow terms having less than a threshold term frequency inverse document frequency score, such as stop words like "the", "a," "and," and the like. Various types of TF-IDF scores may be used, including Okapi BM25. In some embodiments, patterns may match to strings within a threshold edit distance of a specified string or class of strings, like a Levenshtein edit distance. In some embodiments, patterns may be specified by regular expressions or natural language search operators. In some embodiments, patterns may include operators that specify tokens must appear within a threshold number of characters or tokens of other search terms. Some patterns may specify spatial features in image space, e.g., tokens must appear within 50 pixels of another specified token. Some patterns may specify that tokens must appear within the same sentence or paragraph or threshold number of words in a document or sentence or paragraph from the beginning or end.

In some embodiments, patterns may be specified by natural language processing models. For instance, some embodiments may form a latent semantic analysis (LSA) model from a labeled corpus and classify units of text, like tokens, n-grams, sentences, paragraphs, or documents based upon distances between labeled examples and text in an image with LSA, for instance, based on cosine distance between sparse vectors having dimensions indicating which n-grams are present and how many times those n-grams are present in the training set example and a unit of text being classified. Other examples may implement latent Dirichlet allocation (LDA) to train a model to classify units of text by topic, and the patterns may be implemented by models configured to score and classify text according to the strength with which it exhibits various topics. Other examples may implement sentiment analysis models, named entity detection models, proper noun detection models, or various forms of information extraction models to form the patterns.

In some embodiments, the patterns may have associated therewith a type, for instance, a type in a ranking or other form of ontology, like a hierarchical taxonomy, of confidential information. In some embodiments, different types of confidential information may have different severity for purposes of risk scoring. In some embodiments, the type may be a weight associated with instances of text matching the pattern, and risk scores may be calculated by weighting the instances with these weights, such that a user sharing a relatively large amount of low-grade confidential information may have a lower risk score than another user sharing a relatively smart small amount of high-grade confidential information for purposes of scoring risk.

In some embodiments, patterns may be hand coded by users, such as an administrator of a tenant account. In some embodiments, patterns may be learned by training one or more the above-describe types of machine learning models on historical labeled training sets of confidential and non-confidential text. Or some embodiments may implement a hybrid approach.

Some embodiments may include a user interface by which users may select redacted text to indicate that they believe the text was improperly redacted or select unredacted text to indicate that they believe the text was improperly unredacted. Some embodiments may aggregate these reports, for instance, by calculating an aggregate amount of false positive reactions for each pattern and ranking the results in a report to an administrator to guide subsequent editing of patterns. Further, some embodiments may log and present reports of false negatives to guide subsequent editing in addition of patterns.

As noted, some embodiments may report screenshots with bounding boxes of windows and identifiers of applications in those windows queried from an operating system, and some embodiments may apply patterns that specify these applications, for instance, as criteria in other patterns or as standalone patterns themselves. For example, some embodiments may include a pattern that designates text matching a regular expression and appearing within a bounding box of a window for Microsoft Excel™, or some embodiments may designate for redaction the entire content of any window corresponding to a user interface of a computer aided design (CAD) application.

Some embodiments may further include a content repository 36 that may include instances of uploaded screenshots or screen casts videos. In some embodiments, this content may be organized, as described above, in various boards associated with the content in the content repository 36. In some embodiments, individual instances of continent 10 to may be stored in multiple associated versions in the content repository 36, for instance, in unredacted and redacted form, or with varying amounts of redaction in different versions corresponding to different levels of access afforded different permission designations for different user accounts. For example, some embodiments may redact information of type one for a first group of users and information of types one and two for a second group of users, while redacting no information for a third type of users. Some embodiments may perform the redactions in advance of receiving a request to review content and store the result in memory, which is expected to expedite responses to such requests, reducing latency. For instance, some embodiments may perform the redaction at the time content is uploaded, in response to such an upload, and service request for content within less than two seconds, e.g., less than 500 milliseconds or less than 200 milliseconds of receiving the request.

To expedite pattern matching for some types of patterns, e.g., keyword matches, some embodiments may organize patterns in data structures designed to afford relatively fast computation. For instance, keywords may be arranged in a hash table, prefix tree, or bloom filter to afford relatively fast matching relative to more naïve approaches.

Some embodiments may further include a team repository 38 including team records that have identifiers of each user on a team, roles and permissions of users on a team, an identifier of a tenant account associated with the team, and one or more boards or other instances of content accessible to the team. In some embodiments, various types of access described herein may be allocated at the level of the individual, the team, the tenant, and such access may be granted with relatively high granularity to individual units of content, boards, or collections of boards.

Some embodiments may further include a text scoring module 40. Upon a user uploading a content item, like a screenshot, some embodiments may send the bitmap image to the OCR service 18, which may respond with an OCR record like that described above. In some embodiments, the text scoring module 40 may parse from that OCR record units of text in text format determined by OCRing to appear in the image. In some embodiments, the text format may group the depicted text by line without explicitly indicating whether the text is arranged in a single column, multiple columns, with inserts, or the like, other than to indicate bounding boxes of each unit of text and pixel coordinates of the image. In some embodiments, the image sent to be OCRed may be sent with instructions that indicate pixel coordinates of a subset of the image to OCR, for example, to expedite the OCRing operation. Or some embodiments may trim a subset of the image to be sent to be OCRed to reduce bandwidth costs in accordance with the techniques described below by which subsets of images are filtered to identify the subsets likely to have relevant text.

Text may be scored based on the above-describe patterns. In some embodiments, the text is scored based on the number of patterns matching, a weighted sum of patterns matched using the above-described pattern weights, a topic score produced by LDA, a semantic score produced by LSA, a sentiment analysis score, or the like. In some embodiments, the score is a Boolean value indicating whether any pattern is matched. In some embodiments, the score is a vector having a dimension for each pattern in an implicated policy, and each dimension may have a value like a Boolean value or a weight of the pattern. In some embodiments, any of these types of scores may be calculated for each of various units of text. Some embodiments may calculate a score for each token, for each distinct n-gram up to some threshold size (like greater than two, greater than four, or greater than seven), each sentence, each line, or each paragraph. For example, some embodiments may calculate a vector for each distinct n-gram of up to five consecutive tokens, the vector having greater than 10, 20, or 100 dimensions corresponding to the patterns in the policy.

Some embodiments may include a text classifier 42 configured to classify text based on the score. In some embodiments, text may be classified based on a Boolean value indicating whether any of the patterns are matched. For instance, a token may be classified as confidential in response to determining that at least any one of 10 patterns in a policy is matched by the token. Or some embodiments may classify text based on a determination that the score or transformation based on the score satisfies (e.g. exceeds or is below) some threshold value. For instance, some embodiments may designate a region of a vector space as corresponding to a classification and determine the above-described vector having a dimension for each pattern resides within the region. Some embodiments may classify such vectors with a decision learning tree or random forests, for example, trained with CART on historical labeled examples of confidential or nonconfidential text.

In some embodiments, the classification is a binary classification as confidential or nonconfidential. In some embodiments, the classification is into a ranking of different confidentiality levels. In some cases, the classification is to into a hierarchical taxonomy or other ontology, for instance with classifications indicating that text is confidential and is only to be viewed by employees above a threshold rank, or is confidential and only to be viewed by users on the same team or on the same tenant account or within the same network. In some embodiments, the classifications indicate that the text is indicative of a particular state of mind, such as a disgruntled employee, happy customer, angry vendor, or the like. Some embodiments may apply different transformations to image pixel values based upon these different classifications, for example, highlighting text corresponding to a particular state of mind, while redacting other text classified as confidential.

In some cases, a given token may be subject to multiple classifications in virtue of being part of different n-grams classified in different ways. Some embodiments may select a classification that affords a highest amount of confidential information protection from among these different classifications for the given token.

Some embodiments may include an obfuscator 44 configured to redact or otherwise obfuscate depictions of text classified as confidential in bitmap images. In some embodiments, the obfuscator may modify pixel values in memory of a single copy of the bitmap image, or some embodiments may form a new copy of the bitmap image in which a subset of the pixel values are modified to obfuscate some of the text classified as confidential or otherwise transform images representing text. In some embodiments, the obfuscator 44 may determine which text is classified in a way that accords with a particular transformation to the image and then apply that transformation. In some embodiments, the different classifications may be mapped to different image transformations, for instance, designating some classifications as corresponding to redaction, some classifications as corresponding to highlighting, and the like.

In some embodiments, the obfuscator 44 may determine which units of text are classified as confidential and then determine bounding boxes from the OCR record in pixel coordinates of those bodies of text. Thus, some embodiments of the obfuscator 44 may transform a set of tokens classified as confidential into a set of bounding boxes of regions of pixels depicting that text into the bitmap image. Some embodiments may merge adjacent bounding boxes into a single bounding box, for instance, by determining that two confidential units of text are separated by a delimiter and in response changing a rightmost bounding box coordinate set from one token to be equal to the rightmost bounding box coordinate set for the adjacent token. In this manner, some embodiments may mitigate information leakage in the form of the number of characters in a redacted string. Or some embodiments may leave white space characters unredacted, which is not to imply other features may not be varied.

Some embodiments may then modify pixel values in the regions of the bitmap image designated by these bounding boxes. To this end, some embodiments may iterate through the bounding box or other shape, for instance, rastering from a top left corner to a bottom right corner to select coordinates of individual pixels and then modifying those pixel values. Pixel values may be modified in a variety of ways to redact text. Some embodiments may set pixel values to display the color black. Some embodiments may set pixel values to display the color white. Some embodiments may select a color to which pixel values are set in redaction based on a median color of the bitmap image. In some embodiments, it may be desirable to clearly indicate which regions of an image are redacted by choosing a redaction color that is different from a background color. Some embodiments may infer a background color based on a median pixel value for the image, for instance, a median red, blue, and green sub-pixel value, and then some embodiments may select an opposing color from a color space mapping, for instance selecting a white redaction color for text on a black background, or selecting purple redaction for an orange background. Or some embodiments may select as the redaction color the color of text. For example, some embodiments may determine that color corresponds to text in a bounding box by determining a histogram of pixel colors in the bounding box and selecting a peak in the histogram that is different from pixel colors corresponding to a perimeter of the bounding box (e.g., an average pixel value at the permiter).

Some embodiments may modifying pixel values with other types of transformations. For example, some embodiments may apply a blurring convolution to pixels in the bounding box, such as a Gaussian blur convolution. For example, for each pixel, some embodiments may calculate the average of pixels within five pixels in each direction in image space and set the value of that central pixel to be equal to the average.

In some embodiments, the resulting redacted version of the screen capture bitmap image may be stored in the content repository 36, for instance, with an identifier that associates the redaction version with the original version, and some embodiments may selectively provide access to the different versions depending upon whether a user is authenticated or has permission.

Some embodiments may facilitate sharing by associating the set of versions of the bitmap image with a relatively short uniform resource locator with the URL generator 46. Some embodiments may determine a URL of the collection of versions, such as a URL with less than eight characters, less than 16 characters, or less than 32 characters. To generate the URL, some embodiments may calculate a hash digest of the bitmap image, such as the unredacted version or the redacted version, and include this digest in the URL. Some embodiments may provide the URL to the user computing device 14 uploaded the image and present the URL in association with the image in a webpage provided by the web server 26, and users may share the image by providing the URL to other users, for instance, by texting, email, or the like.

In some embodiments, the URLs may expire assets over some duration of time. For example, after the URLs created, a timestamp may be associated with URL by the application 12, and some embodiments may deindex the URL to the content referenced by the URL in response to determining that a threshold duration of time has elapsed or a step threshold number of access requests have been received.

Some embodiments may assess risk of individual content items, sharing behavior of a person over a single session, sharing behavior of a person over multiple sessions, sharing behavior of a team, or sharing behavior of a tenant based upon the above-describe classifications. For example, some embodiments may calculate a risk score based on a weighted sum of different types of risk classification instances for content items in any of these groupings or instances in which content items are shared in any of these groupings. In some embodiments, sharing instances may be weighted based upon classification of recipient or sender, for instance, a greater weight may be assigned to a sharing instance where the recipient is not on the same team, does not have an account associated with the same tenant, is not on the same local area network as the sharer, does not have permission, is on a computing device that has not previously accessed content shared by the user, other members of the team, or other user accounts associated with the tenant, or the like. Thus, risk scores, in some cases, may reflect sharing of confidential information generally or sharing of confidential information with particular types of recipients. In some embodiments, scoring of risk associated with sharing instances may depend upon a role assigned to a sharing person in a tenant account, for instance, a public relations or marketing person may be expected to share more prolifically than an engineer, and the above-described sharing instance weightings may be adjusted based upon weights assigned to these roles, for instance in tenant policies, as weighted sums.

Risks will scores may be used to a variety of ends. Some embodiments may send instructions that cause a browser to present a risk dashboard user interface via the web server 26 to a user associated with a tenant's administrator account, for instance, presenting in ranked order teams or users by risk score, listing those teams or users with greater than a threshold risk score, presenting a timeseries graph showing risk scores for users or teams over time (like a measure of central tendency over some trailing duration, like one week or one month), showing a histogram of risk scores for users or teams, or the like. Some embodiments may dynamically adjust permissions based upon risk scores, for instance, removing permissions associated with user accounts that permit unredacted sharing outside of an organization, removing permissions that permit sharing at all, adjusting thresholds by which information is classified as confidential to increase the amount of information classified as confidential, or the like. Some embodiments may send or log alerts, for instance, sending an email or text message to an administrator who has registered a email account or cell phone number to receive such alerts.

In some embodiments, responsive to the risk monitor or settings in a tenant policy, some embodiments may modulate access control with access control module 50. In some embodiments, this may include responding to the above-described risk related alerts to depermission users automatically. Some embodiments may determine whether a request for a content item at a given URL should be serviced with a more heavily redacted version, a less heavily redacted version, or an unredacted version of a content item based upon permissions associated with a request or permissions associated with a sharer that created the content item at the given URL. Some embodiments may deindex URLs from content items responsive to determining that the URL was created more than a threshold duration of time in the past or that the content item at the URL has been access more than a threshold amount of times or the access requests indicate greater than a threshold level of risk. Some embodiments may selectively provide access based upon roles and permissions. For example, some embodiments may automatically provide access to unredacted versions of content items to members on the same team or to users in the same tenant organization or to users on the same or a specified local area network or virtual private network, while blocking access or providing access to redacted versions to users requesting content that do not satisfy these criteria. Some embodiments may rate limit access requests associated with individual users or computing devices, for instance, by maintaining a count of a number of access request received over a trailing duration of time and blocking or throttling responses by inserting delays when the count exceeds a threshold.

Figure 2:
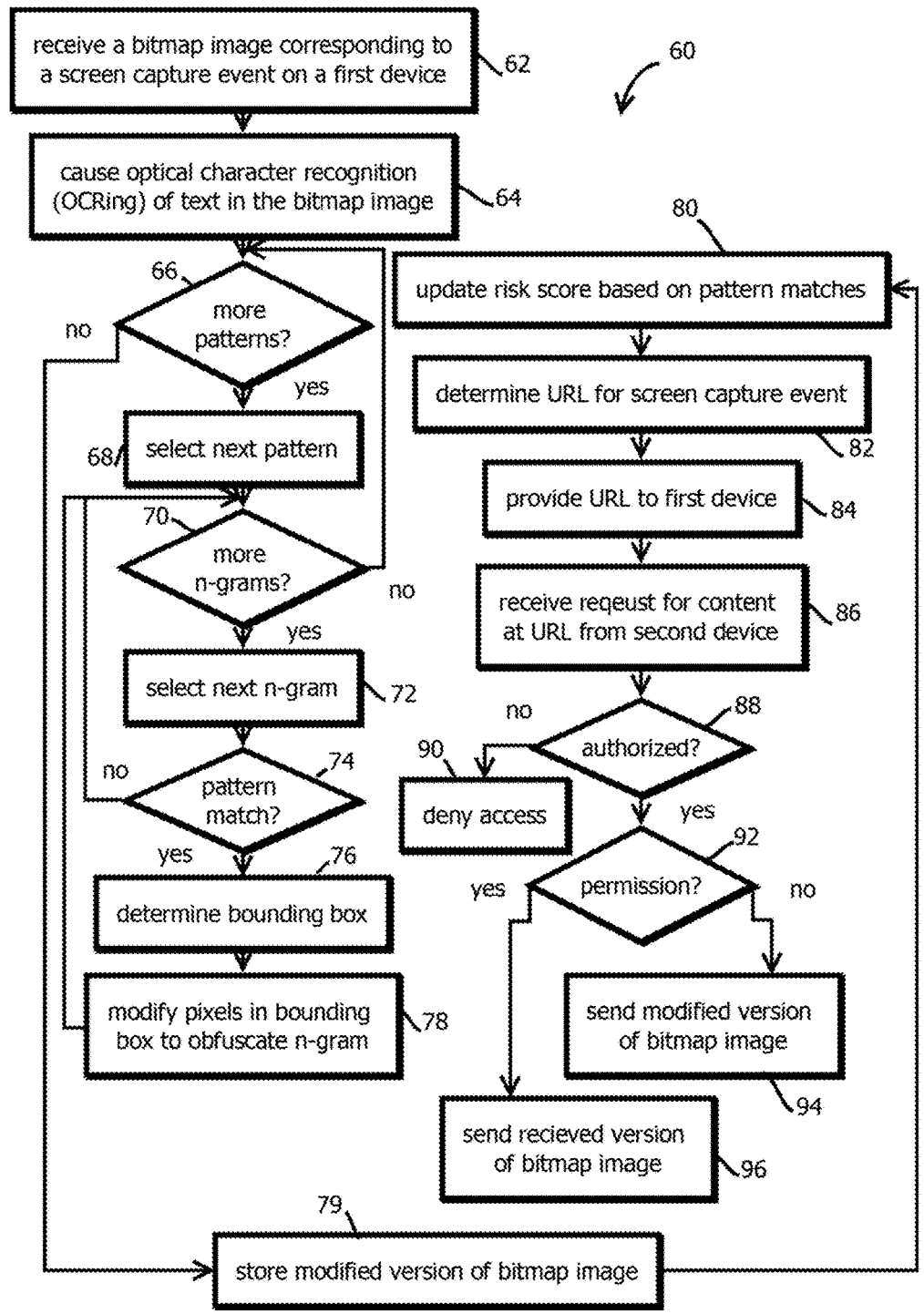
FIG. 2 is a flowchart showing an example of a process to redact confidential information in shared image content in accordance with some embodiments of the present techniques.

FIG. 2 shows an example of a process 60 that may be implemented in the computing environment 10 described above, which is not limited to that implementation, and which is not to suggest that any other description herein is limiting. In some embodiments, program code by which the functionality of process 60 and the other functionality described herein is implemented may be stored on a tangible, non-transitory, machine-readable medium, such that when that program code is executed by one or more processors, the described functionality is effectuated. The term "medium," singular, is used herein to refer to either a singular instance or media or multiple instances of media storing different subsets of the program code, for instance, in memory of different computing devices. So reference to singular "medium" should be read as encompassing instances in which different subsets of the described instructions are executed on different computing devices. The illustrated operations may be executed in a different order from that shown, additional instructions may be inserted, instructions may be omitted, the instructions may be executed serially in the order depicted, instructions may be executed concurrently, some of the instructions may be executed multiple times, in some cases in multiple instances concurrently, and the illustrated operations may otherwise be differently arranged from that illustrated, which is not suggest that any other description herein is limiting.

Some embodiments may receive a bitmap image corresponding to a screen capture event on a first device, as illustrated by block 62. In some cases, this operation may be performed by the screen-sharing application 22, or a bitmap image may also be characterized as having been received by the screen-content sharing application 12 upon the screen-sharing application 22 sending that bitmap image to the screen-content sharing application 12. As noted, in some cases, the bitmap image is received in compressed encoded format or uncompressed format. In some embodiments, the bitmap image is received with metadata identifying a user account sharing the bitmap image corresponding to records in the illustrated repositories of FIG. 1. In some embodiments, the bitmap image is received with metadata obtained from the operating system indicating bounding boxes of different windows and identifiers of applications depicted in those windows. In some embodiments, the above-describe patterns may include operators that specify these applications, for example, designating some patterns as only applying to certain subsets of applications or individual applications installed on user devices.

Some embodiments may then cause optical character recognition of text in the bitmap image, as indicated by block 64. As noted, the text "in the bitmap image" refers to text depicted in the bitmap image, not a string explicitly encoded, for example, in ASCII format or Unicode format, prior to OCR in, at least from the perspective of a computational entity only with access to the bitmap image. Causing optical character recognition may include performing the OCRing, for instance, with the Tesseract library, or some embodiments may send the bitmap image to a OCRing service over a network, such as the OCR service hosted by Google Inc. Upon causing the OCRing, some embodiments may receive a text document with results of the OCRing, the text document including a plurality of entries, each entry including text depicted in a subset of the document, like a line of text, and a bounding box with pixel coordinates indicating where in the bitmap image that text is depicted. In some embodiments, this text document may be in a serialized hierarchical data format, for instance, as a collection of lists and dictionaries, like in a JSON document.

Some embodiments may then access a collection of patterns in a policy in a tenant account associated with the user from which the bitmap image is received and determine whether there are more patterns in the set to process, as indicate by block 66. Upon determining that there are more patterns to process, some embodiments may select a next pattern in the set, as indicated by block 68. Some embodiments may then determine whether there are more n-grams in the OCR results to compare to the selected pattern, as indicated by block 70. Upon determining that there are more n-grams process, some embodiments may select a next n-gram, as indicated by block 72. In some cases, this may include incrementing forward one token and selecting the next n-gram of some threshold size and repeating this process iteratively for increasing sizes, for instance, ranging from one up through five tokens in series. Some embodiments may then determine whether the selected n-gram matches the pattern, as indicated by block 74. Upon determining that the pattern does not match, some embodiments may return to block 70 to determine whether there are more n-grams to compare with the pattern. Upon determining that there are no more n-grams to compare with the pattern, some embodiments may return to block 66 to determine whether there are more patterns to process.

Alternatively in block 74, upon determining that the patterns match, some embodiments may proceed to block 76 and determine a bounding box. In some embodiments, this may include accessing one or more bounding boxes specified in the OCR record, in some cases appending those bounding boxes to a set of bounding boxes in which text is to be redacted, and in some cases merging the bounding boxes, for instance, by determining a convex hull of the bounding boxes, determining a minimum bounding box that contains all the bounding boxes, merging those bounding boxes separated by white space characters, or the like.

Some embodiments may then modify pixels in the bounding box to obfuscate the pattern matching n-gram, as indicated by block 78. Obfuscation may take any of the above-described forms, and as noted above, modification may include changing values in an existing copy or forming a new copy without modifying an original copy. Upon modifying the pixels, some embodiments may return to block 70. Or some embodiments may execute these operations in a different order, for instance, identifying all pattern matches before determining bounding boxes and modifying pixels, which is not to suggest that any other describe sequence or described feature herein is limiting.

Upon determining that there are no more patterns to match, some embodiments may proceed to store the modified version of the bitmap image, as indicated by block 79, for instance in the above-describe content repository 36. As noted, some embodiments may store multiple versions of the bitmap image, some modified with different amounts of redaction, and associated with an identifier associated with the collection of different versions.

Some embodiments may proceed to update a risk score based on the pattern matches, as indicated by block 80. Some embodiments may update risk scores as a batch process, for instance, daily or in response to events, like an individual sharing event. Some embodiments may update risk scores by calculating aggregate values, like measures of central tendency, such as means, medians, or modes, over collections of risk scores from individual content items that are shared or individual instances in which content items are shared, for instance, over a trailing duration of time, like over a day, week, or month, in some cases down-weighting older risk scores in the aggregate, for instance with a half-life weighting that decreases the effect of events over time. Such aggregate risk scores may be calculated for users, teams, types of classified content, tenants, client-side applications in which the content is depicted in screenshots or videos, or the like. Results may be depicted in dashboards like those described above, for instance in rankings, time-series, list of those exceeding some threshold, or the like, and results may be acted upon by logging or alerting instances in which thresholds are exceeded or automatically depermission users.

Some embodiments may determine a URL for the screen capture to be shared, as indicated by block 82, and provide that URL to the first computing device, as indicated by block

84. The user of the first device may then provide that URL to other users, which may request their browser to navigate to the URL to retrieve the shared content or redacted version thereof from a remote server. As a result, some embodiments may subsequently receive a request for content at the URL from a second computing device, as indicated by block 86. Some embodiments may determine whether the requester is authorized, as indicated by block 88, for instance whether they have supplied the appropriate credentials, are associated with the appropriate role, are on the appropriate network, or are on the appropriate team or tenant account, and in response to determining the user is not authorized, deny access, as indicated by block 90. Alternatively, some embodiments may then determine whether the user has permission to access the shared content in unredacted form, for instance, based on one or more of these criteria as well, as indicated by block 92. Upon determining that the user does not have permission to access the content in unredacted form, some embodiments may send the modified version of the bitmap image to the second computing device, as indicated by block 94. Alternatively, upon determining the user has permission, some embodiments may send the received version of the bitmap image, as indicated by block 96, an operation that may include sending a version subject to some transformation that leaves the text unredacted, for instance, a version that is compressed with a different compression format from that in which it is received may still serve as sending the received version.

FIG. 3 shows an example of a screen captured bitmap image 100 having regions 102 with depicted text expressed as pixel values. Four examples are labeled with element numbers, but the bitmap image, as illustrated, include substantially more. It should be emphasized that the bitmap image, as received by the sharing application, is a collection of pixel coordinates and pixel intensities and does not directly explicitly indicate to a computer the depicted text, the font of the depicted text, or the any particular subset of the image depicts text, despite the appearance of such text being self-evident to a human viewer.

FIG. 4 shows a modified version 104 of the screenshot in which some of the regions 106 have been modified to redact portions of the text while other regions 102 remain unredacted In some embodiments, techniques like those described above may be applied to protect information conveyed via video, for example, screen casts video from screen-sharing applications. Video may present particular challenges due to scaling issues that arise from the number of images presented in the frames of video and the leakage of information across sequential frames that, in some cases may not be present in any one frame. To mitigate one or more of these challenges, some embodiments may implement a server-side screen-content sharing application 120 shown in FIG. 5. The computing environment 10 of FIG. 5 may be like that of FIG. 1, with like element numbers depicting components with the same or similar features.

To that computing environment 10, some embodiments may add to the screen-content sharing application an inter-frame entropy scoring module 122, a frame filter 124, a video segmenter 126, and access control module and a reverse selector module 128. These components may be controlled by the control module 30, which in some cases may cause the components of the application 122 cooperate to effectuate a process described below with reference to FIG. 6. In some embodiments, the application 120 may be configured to classify information appearing in video frames, such as text information from OCRing video frames, and manipulate pixel values in the video frames based on the classification, for instance, to redact or otherwise obfuscate text classified as confidential. Some embodiments may expedite processing of video in this manner by selectively OCRing a subset of frames determined to have a relatively large entropy score relative to previous frames, indicating that screen content has substantially changed relative to what was previously depicted. Further, some embodiments may selectively designate subsets of the frame for processing by OCR based on various intraframe filters. Some embodiments may expedite processing by filtering or manipulating video frames in their compressed encoded state, in some cases leveraging processing from the encoding or decoding process of a video codec to expedite filtering of frames or filtering of subsets of frames and manipulation of pixel values within frames.

It should be emphasized that while the components 122, 124, 126, and 128 are shown as part of the server-side application 120, in some embodiments, any subset of the described functionality of these modules or all of that functionality may be offloaded to client-side applications 22, for instance, to keep confidential information resident on the client device. To this end, in some embodiments (both consistent with FIG. 5 and FIG. 1) policies may be downloaded to client applications 22, such as policy having patterns by which text is classified. In some cases, policies may be pushed to the client application 22 or pulled by the client application 22.

In some cases, users may screen cast video with their client-side screen-sharing application 22. Screen casting video may show the client device's display as it evolves over time, while the user interacts with various user interfaces displayed thereon. In some cases, screen cast video may further include audio, such as audio generated by the computer presenting the display or audio supplied by the user via a microphone, for example, to explain their actions in the user interfaces in a tutorial. As a result, many of the above-described concerns with confidential information leaking via still images apply in the context of screen cast video. In some cases, the video may be shared in real time, for example, in video chat where the video is streamed and displayed on a recipients computing device within less than one second, such as less than 200 ms, of when the displayed events occur on the client computing device screen casting the video. In some cases, the video may be recorded for sharing at a later time, for instance, for being stored in one of the above-described boards and shared among members of a team, a tenant account, or outside of tenant accounts, for example, with the general public.

The above-described access control techniques may be applied to video content in a manner similar or identical to that described with reference to screen capture images.

Similarly, the above-described risk monitoring techniques may be applied to video content in a manner that is similar or identical to that described with reference to screen capture images.

In some embodiments, the inter-frame entropy scoring module 122 may be configured to receive a screen cast video. In some cases, the entire screen cast video may be received concurrently, for instance, a stored screen cast video uploaded for sharing in non-real-time use cases. In some cases, the screen cast video may be received as a stream, for instance, in video chat applications, where some segments of the video are received before the video in its entirety is received and in some cases before the video in its entirety is generated. In some cases, screen cast video may be received in a compressed encoding format, for instance, after compressing the video frames with the video codec. Examples include MPEG-4, AV1, VP 8, VP 9, and the like. In some embodiments, the video codec may designate different frames as i-frames, p-frames, or b-frames, depending upon amounts of change in information depicted between frames. In some embodiments, the video codec may compress individual frames by segmenting the individual frames into square blocks, such as an eight pixel by eight pixel blocks or larger. In some embodiments, those blocks may be transformed, such as into a discrete cosine transform matrix or an asymmetric discrete sine transform matrix, in which spatial frequency components of variation in pixel intensity are represented in various matrix values. Some embodiments may threshold these matrices according to a quantization matrix to set a subset of the values to zero. Some embodiments may then compress the resulting matrix values, for instance, with entropy coding compression algorithm, like Huffman coding, arithmetic coding, or the like. In some embodiments, the compressed encoding may further include movement vectors of various blocks or macro blocks indicating changes in position of blocks between frames, for instance, relative to an i-frame that proceeds a given p or b frame. In some embodiments, the compression is lossy or in some embodiments the compression is lossless. In some embodiments, the compressed video is sent from the client screen sharing application 22 to the server-side screen-content sharing application 120, or some embodiments may apply the below-described filtering techniques on the client side and only send a subset of the frames or subset of individual frames to the server-side application 120 for processing.

In some embodiments, at each frame or periodically, the operating system may be queried by the screen-sharing application for a current state of bounding boxes of applications and identifiers of those applications. Some embodiments may associate a stream of window bounding box data with the video for purposes of classification using techniques like those described above. In some cases, the client application 22 may periodically or responsive to some event (like one signaling a screen capture) query the operating system with, for example, an EnumWindows command to obtain a list of windows (and in some cases, identifiers of applications) and then iterate through members of that list and call a GetWindowRect function to obtain bounding boxes in screen coordinates of displayed windows. This information may be reported, in some case, with an offset to coordinate origins of a screen capture, e.g., where the screen capture is a subset of the screen and screen coordinates have a different origin from image pixel coordinates, so that embodiments may translate between the coordinate systems and overlay the bounding boxes of identified windows on the screen shot to add an additional channel of information about the displayed information.

Some embodiments may decode the compressed video with a suitable video decoder and access the individual frames a video, which may each be a bitmap image having an associated sequence identifier in the sequence of frames of the video. Some embodiments of the scoring module 122 may determine an inter-frame entropy score that indicates an amount of change in information presented in a given frame relative to one or more previous frames. In some embodiments, the entropy score may be an aggregate value based upon a pixel-by-pixel subtraction of one frame from a preceeding frame, such as a root-mean-square (RMS) value of pixel deltas. Some embodiments may determine the difference as a perceived difference with metrics described in a paper titled "Measuring perceived color difference using YIQ NTSC transmission color space in mobile applications" by Kotsarenko et al., Programación Matematica y Software (2010), Vol. 2. No 2. ISSN: 2007-3283, the contents of which are hereby incorporated by reference.

In some embodiments, some of these differences may be discarded as being caused by various artifacts that are not indicative of changes in client-side program state, such as differences due to antialiasing. To filter out these differences, some embodiments may apply the techniques in a paper titled "Anit-alias Pixel Intensity Slope Detector" Vysniauskas, Elektronika it Elektrotechnika, October 2009, the contents of which are hereby incorporated by reference. Lossy compression may similarly give rise to some differences. Some embodiments may down weight differences, for instance, by multiplying by a weight coefficient between zero and one with differences in blocks including a mouse pointer, for example, which may cause lossy compression artifacts to vary between frames in local blocks if the mouse pointer moves but nothing else on the screen changes.

In some embodiments, to expedite processing, pixel values and frames may be sampled, for instance some embodiments may determine pixel-by-pixel differences only for every even row or column (or both), of pixel values. Or some embodiments may sample more sparsely, for instance, sampling every 10th pixel horizontally in every 10th row to determine deltas.

Some embodiments may assign entropy scores to entire frames, or some embodiments may also assign scores to subsets of frames, for instance some embodiments may determine a convex hull or bounding box of pixel values having greater than a threshold delta between consecutive frames and designate only those pixels within these bounding areas as warranting subsequent processing to redact subsets of frames. Or some embodiments designate areas in bounding boxes of windows in which an aggregate amount of difference exceeds some threshold.

In some embodiments, the video compression encoding process may be leveraged to expedite identification of frames having a relatively high entropy relative to an earlier frame. Some embodiments may designate i-frames labeled in the compression encoding as having a binary entropy score of one and non-i-frames having a binary entropy score of zero. In another example, some embodiments may infer inter-frame entropy based upon an amount of data encoding a non-i-frame relative to a previous i-frame or a previous non-a frame.

In some embodiments, the inter-frame entropy score is based upon differences between a given frame and multiple preceeding frames or a non-sequentially adjacent proceeding frame. For example, some embodiments may determine a difference between a given frame and a frame two, four, six, or eight frames earlier to avoid scenarios by which information gradually creeps onto a display, for instance with a slowly moved window that is gradually moved from a peripheral offscreen position into a portion of the display screen where the window is visible. Some embodiments may determine an aggregate score based upon both these earlier frames and an immediately preceding frame, such as a score of zero if neither of these types of earlier frames produces an aggregate measure of difference greater than a threshold and a score of one if either one of these produces an aggregate measure of difference greater than one. Or some embodiments may calculate an aggregate score relative to multiple preceding frames based, for example, on a weighted sum with a half-life weighting assigned to differences of each of a number of proceeding frames.

Some embodiments may leverage compression encoding to facilitate concurrent operations. For example, some embodiments may segment a video by i-frame and then concurrent currently processed video frames in different threads or processes with the techniques described herein on each of the different segments starting with a distinct i-frame. Or some embodiments may concurrently determine inter-frame entropy scores on each of multiple frames, for instance, in some cases with map reduce operations in which a mapping function determines pixel differences and a reducing function determines an aggregate measure, for example with a Hadoop implementation.

Some embodiments may then filter the frames with a frame filter 124 to select a subset of the frames to be OCRed or otherwise subject to more intensive and computationally expensive analysis. In some embodiments, the frame filter may filter the frames based upon the inter-frame entropy scores, for instance, selecting those frames having greater than a threshold score (or less than a threshold score if signs are reversed) for processing. Thus, some embodiments may select a subset of the frames in the video having a relatively large amount of entropy, or presented information, relative to earlier frames in the sequence.

Further, in some embodiments, the frame filter may select subsets of individual frames to be OCRed or otherwise subject to more intensive and computationally expensive analysis. Some embodiments may designate subsets of frames corresponding to bounding boxes of applications having particular identifiers to be subject to this analysis or to be excluded from this analysis. In some embodiments, an API of the OCR service may include an input by which pixel coordinates may be designated for analysis and OCRing. In some embodiments, images, like frames, submitting to be OCRed may be modified to effectuate faster transmission and OCRing, for instance, by setting pixel values to clear or white in regions that are not to be OCRed, thereby enhancing compression of the image for transmission and potentially expediting the OCR operations by reducing the pixel count involving more intensive analysis.

Or some embodiments may break up a frame into multiple images from subsets of the frame and submit those different images to be OCRed. In this example, some embodiments may maintain a mapping of coordinate spaces between an origin of the segmented images and an origin of the original frame, and these mappings may be accessed to translate bounding box positions from OCR records back into a coordinate space of the original frame. In some embodiments, the compression encoding may be leveraged to identify subsets of a frame that potentially have text information. For example, some embodiments may designate regions of an image with transform matrix blocks having amplitudes of less than a threshold value for frequency components with greater than a threshold value as containing information unlikely to encode text. For instance, white space transform matrices often have values of zero for all frequency components other than the DC component. Thus, some embodiments may interrogate both the compressed format and the un-compressed bitmap images produced by a video decoder to expedite computation.

Some embodiments may then designate subsequent frames or portions thereof as being represented by frames or portions thereof that pass the frame filter 124 with the video segmentor 126. For example, some of embodiments may associate each selected frame with a duration of time, which in some cases may be represented by a number of subsequent frames and need not be encoded in units of time, and that duration of time may expressly or implicitly identify a set of subsequent frames in the video that will receive the same or similar treatment as the selected frame or subset thereof. In some cases, the video segmentor 126 may, for each selected frame, form a segment that includes each frame until the next selected frame. That is, segments may be delimited by selected frames. In cases in which subsets of frames are individually selected for processing, some embodiments may form a video segment corresponding to, for example an application window, and there may be multiple overlapping segments in time corresponding to different subsets of the area of the display, with pixels in those different areas, along those different segments, being subject to similar or the same processing, based upon an initially selected frame or region thereof. Thus, for example, if only one window in one corner of a display is subject to change over some duration of time, some embodiments may designate the rest of the display as being part of one region and one segment through a relatively long duration of time, while the smaller window in that one corner may be designated as another region that may include multiple segments over that region and the duration of time.

Some embodiments may then submit each of the initially selected frames or regions of frames to the above-describe processing by which bitmap images are selectively redacted or otherwise obfuscated or modified. For instance, upon a user launching a new application window, a new video segment may be started by the video segmentor 126 responsive to the frame filter 124 selecting that initial presentation of information that may be relatively different from what was on the display before. In some cases, that initial presentation of information may then be subject to redaction as a bitmap image with the techniques described above.

In some embodiments, the same or similar modifications applied to the initial frame or segment of a frame of a segment may be applied to each of the subsequent frames in a segment. Thus, for example, if pixel values in a bounding box determined to have text classified as confidential are set to black, those same pixel addresses may be set to black in each of the subsequent frames in a video segment determined by the video segmentor 126. Similar operations may be applied in implementations in which frames are processed as distinct regions, for instance, by window bounding boxes both in time and display space, whereby pixel modifications are carried forward within video segments to portions of subsequent frames, in some cases, with a given frame having different regions in different overlapping segments that start and stop at different times.

In some embodiments, operations may be expedited by manipulating the compressed encoded version of video. For example, some embodiments may manipulate the amplitude components of transform matrices, for example, setting all values to zero except the DC component, which may be set to a value that causes the block to depict black or white. With such manipulation, some embodiments may avoid the relatively computationally expensive operation of fully re-compressing the video. This operation is consistent with reference to manipulating pixel values in a bitmap image. Or some embodiments may directly manipulate pixel values in a bitmap image in uncompressed form and then recompress the video for distribution, which is not to imply that other features may not be varied.

In some cases, a sequence of video frames may leak information in a way that does not match to a pattern, for instance, a video sequence in which a user types in confidential information that does not match to a pattern until a final character is entered. In some cases, it may be desirable to redact these earlier frames to prevent a prefix of the confidential string from being displayed. Another example includes when a user types a password into an input box that automatically displays each typed character and then replaces it with a placeholder, like an asterix. The video sequence may reveal the password, even if the password does not pattern match in a final frame of the sequence because of the replacements with the placeholders.

To mitigate these risks, some embodiments may include a reverse frame selector 128 configured to add earlier frames to a video segment and apply pixel modifications, like redaction to those earlier frames in a manner similar or identical to how those manipulations are applied to the frames subsequent to the frame selected by the frame filter 124. In some cases, the reverse selector 128 may select earlier frames in which (e.g. in response to determining that) a prefix of text classified as confidential is present within a bounding box that overlaps a bounding box of the text classified as confidential. As a result, the prefix being typed may be redacted in some use cases in the earlier frames based upon the confidential information being detected in the later frame, even if that prefix does not match a specified pattern.

Some embodiments may similarly be configured to detect placeholder characters with a pattern that matches to those placeholder characters in a password input. In some cases, a pattern may specify the text of the word password be within some threshold distance on a display of these placeholder characters in OCR text of a selected frame. Some embodiments may then apply the above-described time-reversed redaction technique, for instance, over an entire bounding box region of the fully entered password, in some cases expanding this bounding box over some threshold margin, to obfuscate individual type characters of a password.

FIG. 6 shows an example of a process 150 that may be executed by the above-described system of FIG. 5, though which is not limited to that implementation. The arrangement of operations may be modified in ways like that described above with reference to FIG. 2, which is not to suggest that any other description is limiting.

In some embodiments, the process 150 includes obtaining screen cast video, as indicated by block 152, and determining whether there are more frames of the video to process, as indicated by block 154. Upon determining that there are more frames to process, some embodiments may select a next frame, as indicated by block 156, and score the interframe entropy of that frame relative to earlier frames, as indicated by block 158. Some embodiments may determine whether that score exceeds a threshold, as indicated by block 160. Upon determining that the score does exceeds a threshold, some embodiments may designate frames since a previously selected frame as part of the same video segment beginning with that previously selected frame, as indicated by block 162.

Some embodiments may filter regions of the first frame of the designated segment to OCR, in some cases, as indicated by block 164. In some embodiments, filtering of those regions may include segmenting the frames into different images, each corresponding to different windows or subsets thereof. In some cases, filtering regions may include classifying portions of the frame as indicating information unlikely to be confidential, like toolbars. Some embodiments may detect toolbars with a convolutional neural network trained on labeled examples of display screens, and those trained models may detect and localize, for instance, with bounding boxes, toolbars to be excluded from OCR processing. Or some embodiments may detect those toolbars with unsupervised image processing machine learning models, for example trained on earlier video in which the toolbars exhibit features that appear relatively frequently compared to other content. The unsupervised model may be trained to detect those features that appear more frequently and based on those features detect and localize toolbars to designate areas to be excluded from OCRing.

Some embodiments may OCR the first frame of a segment, or portion thereof, as indicated by block 166. In some cases, this may include causing the first frame to be OCRed by a third party service.

Some embodiments may then score text in the OCR record produced by OCRing, indicated by block 168, for instance, with the techniques described above with reference to FIGS. 1 through 4. Some embodiments may then classify text in the OCR record, for instance, with the techniques described above with reference to FIGS. 1 through 4, as indicated by block 170. Some embodiments may determine whether earlier frames are implicated, as indicated by block 172, for instance, with the above-described reverse selector 128 of FIG. 5. Upon determining that the earlier frames are implicated, some embodiments may prepend the earlier frames to the segment and designate a new frame as the first frame of that segment. As a result, some frames may end up in multiple segments and thus may be manipulated with different types of redaction due to processing of those different segments. To facilitate concurrent operations, some embodiments may lock frames being processed, for example, with a mutex or spin lock, or some embodiments may generate a set of masks to be applied to frames once all operations are complete, thereby redacting the joint set of areas redacted in the masks.

In response to a negative determination in block 172, or upon completing the operations of block 174, some embodiments may modify pixel values in bounding boxes of text classified as confidential to redact that text, as indicated by block 176. Or some embodiments may apply any of the above-described modifications based upon different types of classified text. Some embodiments may proceed to determine whether there are more frames in the segment the process, as indicated by block 178. Upon determining that there are more frames in the segment to process, some embodiments may select a next frame, as indicated by block 180, and return to block 176 to continue modifying pixel values in the bounding boxes of the text classified as confidential in the selected frame by which the segment is defined.

Upon determining that there are no more frames in the segment to process, some embodiments may append the modified segment to the redacted version of the video, as indicated by block 182. As with images, reference to the "video" includes reference to a single copy that is modified or reference to a collection of copies with different versions having different modifications, or reference to any one of those versions.

In block 162, some embodiments may execute concurrent operations in which additional segments are initiated, returning to block 154 to determine whether there are more frames to process. Upon determining that there are no more frames to process, some embodiments may store the redacted version of the screen cast video in memory, as indicated by block once 184, for instance in the above-describe content repository 36. In some embodiments, as with images, multiple versions may be associated with one another with different amounts of redaction applied to different versions (in some cases all associated with the same generated URL) and with different permissioning, and risk scores may be generated in association with those operations.

Some embodiments may selectively share the redacted or unredacted versions of the screen cast video, as indicated by block 186, for example, implementing the above-describe techniques by which authorization and permission are determined or access is otherwise selectively granted, for instance, with different users being exposed to different versions of the video.

In some embodiments, a user interface may be presented in real-time showing a person conducting a screen cast which portions of their video are redacted, so they can see what the person with whom there sharing their screen sees. For example, some embodiments may overlay redacted regions with a different type of pixel modification that designates those regions but still renders them viewable to the person conducting the screen cast. For example, some embodiments change a tint or highlighting of those regions to indicate what is being modified, so that the person conducting the screen cast can understand what the recipient is seeing. Or some embodiments may include a user input by which the person conducting the screen cast can toggle a view to show redacted in unredacted versions of video or screen capture images, so they can understand what they are sharing.

In some embodiments, techniques like those described above may also be applied to audio. For example, some embodiments may submit the audio of a screen cast to a speech-to-text conversion service and apply the above-describe patterns to the text. Some embodiments may change the audio wave form, for example, suppressing it or silencing it during durations of time corresponding to text that matches a pattern.

The above-described techniques are not limited to screen-sharing use cases. Techniques like those applied above may also be applied to other forms of video, audio, images, or documents. For example, the above-describe techniques may be applied to images embedded in emails or other documents, for instance, in an email filter, intrusion detection system, or network firewall. Similarly, the techniques described above may be applied to image content generally in chat messages, Internet traffic, or the like.

This patent filings shares a disclosure with a patent application by the same inventors filed on the same day titled EXPEDITED DETECTION AND LOCALIZATION OF CONFIDENTIAL INFORMATION IN VIDEOS, the content of which is hereby incorporated by reference.

Figure 7:
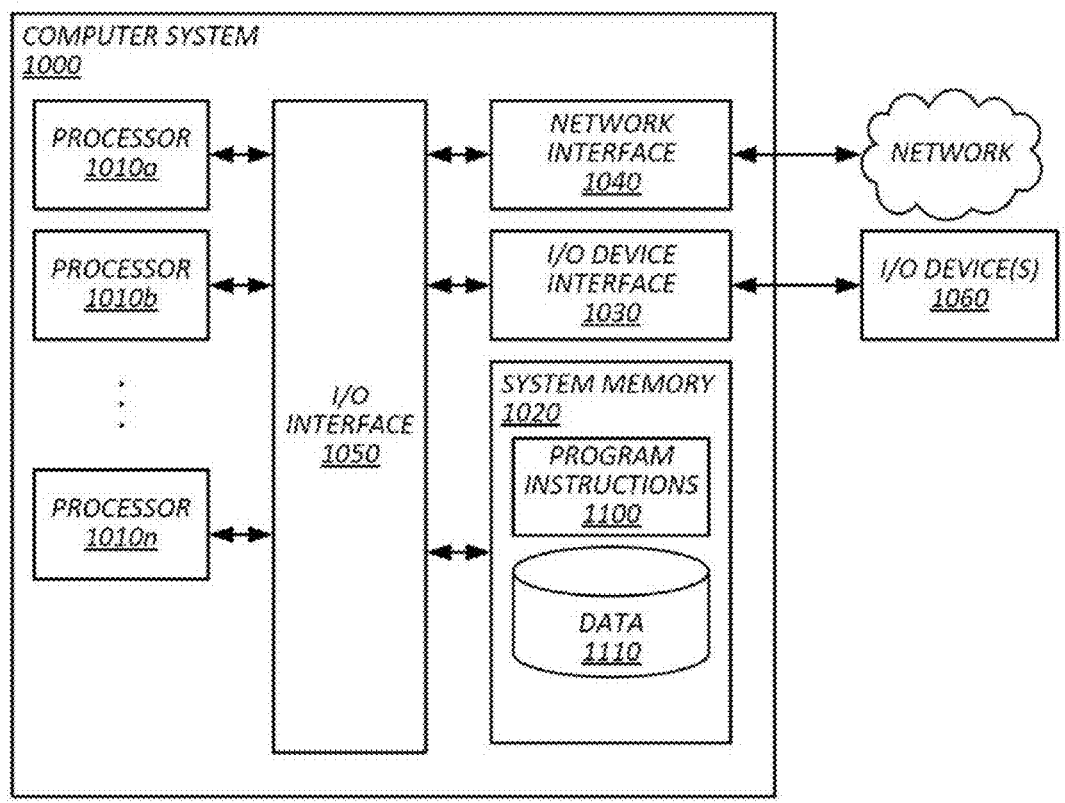
FIG. 7 is a block logical and physical architecture diagram of an example of a computing device by which the present techniques may be implemented.

FIG. 7 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct.

In this patent, certain U.S. patents, U.S. patent applications, or other materials (e.g., articles) have been incorporated by reference. The text of such U.S. patents, U.S. patent applications, and other materials is, however, only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The present techniques will be better understood with reference to the following enumerated embodiments:

1. A tangible, non-transitory, machine-readable medium storing instructions that when executed by one or more processors effectuate operations comprising: obtaining, with one or more processors, screen-cast video of a display of a first user computing device captured by a screen-cast-capable client application executing on the first user computing device, the video comprising a plurality of frames in a sequence of frames, each frame depicting an image of the display at a corresponding time; determining, with one or more processors, amounts of difference between respective frames and one or more frames that precede respective frames; selecting, with one or more processors, a subset of frames from among the plurality of frames based on the subset of frames each having greater than a threshold amount of difference relative to one or more respective preceding frames; associating, with one or more processors, with each frame in the subset of frames, respective indications of durations of time until a respective subsequent selected frame in the subset of frames; causing, in response to the selection, with one or more processors, optical character recognition (OCRing) of each frame in the subset of frames and obtaining corresponding frame-OCR records, each frame-OCR record including text determined by the OCRing to be depicted in a corresponding frame and bounding areas determined by the OCRing indicating display coordinates of pixels depicting the text in the corresponding frame; classifying, with one or more processors, text in each frame-OCR record as confidential or non-confidential; and forming, with one or more processors, a redacted version of the screen-cast video by, for each frame having text classified as confidential: determining bounding areas of the text classified as confidential based on the frame-OCR record corresponding to the respective frame having text classified as confidential; determining a subsequence of frames within the duration of time associated with the respective frame having text classified as confidential; and modifying, based on the determined bounding areas and the determined subsequence, pixel values in the bounding areas for each of the frames in the subsequence to redact the text classified as confidential in the respective frame and the subsequence of frames; and storing, with one or more processors, the redacted version of the screen-cast video in memory.

2. The medium of embodiment 1, wherein determining amounts of difference between respective frames and one or more frames that precede respective frames comprises: determining differences between pixel values at matching coordinates in a respective first frame and a preceding second frame that occurs before the first frame in the sequence of frames of the screen-cast video; and determining a score that indicates an aggregate measure of differences based on the differences between pixel values at matching coordinates.

3. The medium of embodiment 2, wherein: the differences between pixels values are based on a measure of perceived color difference.

4. The medium of embodiment 2, wherein determining differences between pixel values comprises: determining that some pixel values or differences therebetween are an artifact of anti-aliasing and, in response, decreasing or eliminating an effect of those pixel values or differences on the score that indicates the aggregate measure of differences.

5. The medium of any one of embodiments 1-4, wherein determining amounts of difference between respective frames and one or more frames that precede respective frames comprises: filtering out differences that account for less than a threshold amount of the display screen.

6. The medium of any one of embodiments 1-5, wherein classifying text in each frame-OCR record as confidential comprises: tokenizing the text to identify tokens in the text; and determining whether the tokens match any of one or more patterns specified by a policy applying to a plurality of user accounts of a distributed application by which screen-cast videos are shared over a network between client computing devices accessing the user accounts.

7. The medium of any one of embodiments 1-6, comprising: determining a risk score based on the amount of confidential information or type of confidential information in the text in each frame-OCR record; and outputting a report with respective risk scores, including the risk score, of a plurality of screen-casts, users, or teams of users.

8. The medium of embodiment 7, wherein: the risk score is based on both a normalized amount of confidential information and types of confidential information in the screen-cast video.

9. The medium of any one of embodiments 1-8, comprising: after classifying a given unit of text in a given bounding area from a given frame as confidential, accessing the given bounding area in a plurality of frames preceding the given frame and determining that the given unit of text is being typed over the plurality of frames preceding the given frame by causing OCRing of at least the given bounding area in at least some of the preceding frames and determining that OCRing results include a prefix of the given unit of text; and in response to determining that the given unit of text is being typed over the plurality of frames preceding the given frame, redacting the prefix in the given bounding area in the plurality of frames preceding the given frame by modifying pixel values in the given bounding area.

10. The medium of any one of embodiments 1-9, wherein: at least one of the patterns or other patterns matches to a sequence of placeholder characters in a displayed obfuscated password in a password entry text box that replaces typed characters with placeholder characters after the typed characters are shown for a duration of time; and the operations comprise, upon detecting the at one of the patterns match in a given frame, redacting a bounding area of the at least one of the patterns or other patterns in frames preceding given frame to obfuscate password characters displayed individually over a sequence of frames.

11. The medium of any one of embodiments 1-10, wherein: the screen-cast video is obtained in a compressed encoding format of a video codec; and the amounts of difference are determined based on the compression encoding format indicating redundant information across frames.

12. The medium of embodiment 11, wherein: the amounts of difference are determined based on whether a frame is designated as an i-frame.

13. The medium of any one of embodiments 1-12, wherein: the screen-cast video is obtained in a compressed encoding format that specifies frequency components based on discrete cosine transforms of a plurality of blocks in each of frames; and causing OCRing of the subset of frames comprises: designated in the subset of frames video blocks having a frequency components greater than a threshold frequency of less than a threshold amplitude to filter out blocks without enough information to potentially display text; and causing OCRing portions of the subset of frames corresponding to non-designated blocks in response to the designation.

14. The medium of any one of embodiments 1-13, wherein: the screen-cast video is obtained in a compressed encoding format; and modifying pixel values in the bounding areas for each of the frames in the subsequence to redact the text classified as confidential comprises: determining a movement of at least some of the bounding areas from a movement vector of video blocks between frames in the subsequence encoding the compressed encoding format; and translating the bounding area in at least some of the subsequence to different coordinates based on the movement vector before modifying pixel values in the translated version of the bounding area.

15. The medium of any one of embodiments 1-14, wherein: the screen-cast video is obtained in a compressed encoding format; and modifying the pixel values comprises changing frequency components of video blocks in the compressed encoding format to form the redacted version in the compressed encoding format without re-encoding the redacted version in the compressed encoding format.

16. The medium of any one of embodiments 1-15, wherein: a server-side application remote from the screen-cast-capable client application determines amounts of difference between respective frames, selects the subset of frames, associates with each frame in the subset of frames with indications of respective durations of time, causes the OCRing of the subset of frames, classifies text in each frame-OCR record, forms the redacted version of the screen-cast video, and stores the redacted version in memory; the server-side application hosts screen-cast video for a plurality of tenants, each tenant having a respective policy specifying tenant-specific criteria for classifying text as confidential; and the server-side application is configured to cause the redacted version of the screen-cast video to be streamed to another client computing device of user with which the screen-cast video is shared.

17. The medium of any one of embodiments 1-16, wherein: the screen-cast-capable client application determines amounts of difference between respective frames, selects the subset of frames, associates with each frame in the subset of frames respective indications of durations of time; and a server-side application remote from the screen-cast-capable client application classifies text in each frame-OCR record, forms the redacted version of the screen-cast video, and stores the redacted version in memory.

18. The medium of any one of embodiments 1-17, wherein causing OCRing of the subset of the frames comprises, for at least some of the subset of frames: selecting sub-regions of respective frames that exclude toolbars of application user-interfaces displayed in the respective frames; and causing OCRing of the sub-regions and not of regions displaying the excluded toolbars.

19. The medium of embodiment 18, wherein selecting the sub-regions comprises: selecting the sub-regions with a convolutional neural network object-detection and localization model trained on a labeled training set of previous screen-cast videos in which regions of frames with toolbars are labeled.

20. The medium of embodiment 18, wherein selecting the sub-regions comprises: selecting the sub-regions with an unsupervised object detection and localization model trained on past screen-cast videos.

21. A method, comprising: the operations of any one of embodiments 1-20.

22. A system, comprising: one or more processors; and memory storing instructions that when executed by the processors cause the processors to effectuate operations comprising: the operations of any one of embodiments 1-20.

What is claimed is:

1. A tangible, non-transitory, machine-readable medium storing instructions that when executed by one or more processors effectuate operations comprising:
    obtaining, with one or more processors, screen-cast video of a display of a first user computing device captured by a screen-cast-capable client application executing on the first user computing device, the video comprising a plurality of frames in a sequence of frames, each frame depicting an image of the display at a corresponding time;
    determining, with one or more processors, amounts of difference between respective frames and one or more frames that precede respective frames;
    selecting, with one or more processors, a subset of frames from among the plurality of frames based on the subset of frames each having greater than a threshold amount of difference relative to one or more respective preceding frames;
    associating, with one or more processors, with each frame in the subset of frames, respective indications of durations of time until a respective subsequent selected frame in the subset of frames;
    causing, in response to the selection, with one or more processors, optical character recognition (OCRing) of each frame in the subset of frames and obtaining corresponding frame-OCR records, each frame-OCR record including text determined by the OCRing to be depicted in a corresponding frame and bounding areas determined by the OCRing indicating display coordinates of pixels depicting the text in the corresponding frame;
    classifying, with one or more processors, text in each frame-OCR record as confidential or non-confidential; and
    forming, with one or more processors, a redacted version of the screen-cast video by, for each frame having text classified as confidential:
        determining bounding areas of the text classified as confidential based on the frame-OCR record corresponding to the respective frame having text classified as confidential;
        determining a subsequence of frames within the duration of time associated with the respective frame having text classified as confidential; and
        modifying, based on the determined bounding areas and the determined subsequence, pixel values in the bounding areas for each of the frames in the subsequence to redact the text classified as confidential in the respective frame and the subsequence of frames; and
    storing, with one or more processors, the redacted version of the screen-cast video in memory.

2. The medium of claim 1, wherein determining amounts of difference between respective frames and one or more frames that precede respective frames comprises:
    determining differences between pixel values at matching coordinates in a respective first frame and a preceding second frame that occurs before the first frame in the sequence of frames of the screen-cast video; and
    determining a score that indicates an aggregate measure of differences based on the differences between pixel values at matching coordinates.

3. The medium of claim 2, wherein:
    the differences between pixels values are based on a measure of perceived color difference.

4. The medium of claim 2, wherein determining differences between pixel values comprises:
    determining that some pixel values or differences therebetween are an artifact of anti-aliasing and, in response, decreasing or eliminating an effect of those pixel values or differences on the score that indicates the aggregate measure of differences.

5. The medium of claim 1, wherein determining amounts of difference between respective frames and one or more frames that precede respective frames comprises:
    filtering out differences that account for less than a threshold amount of the display screen.

6. The medium of claim 1, wherein classifying text in each frame-OCR record as confidential comprises:
tokenizing the text to identify tokens in the text; and
determining whether the tokens match any of one or more patterns specified by a policy applying to a plurality of user accounts of a distributed application by which screen-cast videos are shared over a network between client computing devices accessing the user accounts.

7. The medium of claim 1, comprising:
determining a risk score based on the amount of confidential information or type of confidential information in the text in each frame-OCR record; and
outputting a report with respective risk scores, including the risk score, of a plurality of screen-casts, users, or teams of users.

8. The medium of claim 7, wherein:
the risk score is based on both a normalized amount of confidential information and types of confidential information in the screen-cast video.

9. The medium of claim 1, comprising:
after classifying a given unit of text in a given bounding area from a given frame as confidential, accessing the given bounding area in a plurality of frames preceding the given frame and determining that the given unit of text is being typed over the plurality of frames preceding the given frame by causing OCRing of at least the given bounding area in at least some of the preceding frames and determining that OCRing results include a prefix of the given unit of text; and
in response to determining that the given unit of text is being typed over the plurality of frames preceding the given frame, redacting the prefix in the given bounding area in the plurality of frames preceding the given frame by modifying pixel values in the given bounding area.

10. The medium of claim 1, wherein:
at least one of the patterns or other patterns matches to a sequence of placeholder characters in a displayed obfuscated password in a password entry text box that replaces typed characters with placeholder characters after the typed characters are shown for a duration of time; and
the operations comprise, upon detecting the at one of the patterns match in a given frame, redacting a bounding area of the at least one of the patterns or other patterns in frames preceding given frame to obfuscate password characters displayed individually over a sequence of frames.

11. The medium of claim 1, wherein:
the screen-cast video is obtained in a compressed encoding format of a video codec; and
the amounts of difference are determined based on the compression encoding format indicating redundant information across frames.

12. The medium of claim 11, wherein:
the amounts of difference are determined based on whether a frame is designated as an i-frame.

13. The medium of claim 1, wherein:
the screen-cast video is obtained in a compressed encoding format that specifies frequency components based on discrete cosine transforms of a plurality of blocks in each of frames; and
causing OCRing of the subset of frames comprises:
designated in the subset of frames video blocks having a frequency components greater than a threshold frequency of less than a threshold amplitude to filter out blocks without enough information to potentially display text; and
causing OCRing portions of the subset of frames corresponding to non-designated blocks in response to the designation.

14. The medium of claim 1, wherein:
the screen-cast video is obtained in a compressed encoding format; and
modifying pixel values in the bounding areas for each of the frames in the subsequence to redact the text classified as confidential comprises:
determining a movement of at least some of the bounding areas from a movement vector of video blocks between frames in the subsequence encoding the compressed encoding format; and
translating the bounding area in at least some of the subsequence to different coordinates based on the movement vector before modifying pixel values in the translated version of the bounding area.

15. The medium of claim 1, wherein:
the screen-cast video is obtained in a compressed encoding format; and
modifying the pixel values comprises changing frequency components of video blocks in the compressed encoding format to form the redacted version in the compressed encoding format without re-encoding the redacted version in the compressed encoding format.

16. The medium of claim 1, wherein:
a server-side application remote from the screen-cast-capable client application determines amounts of difference between respective frames, selects the subset of frames, associates with each frame in the subset of frames with indications of respective durations of time, causes the OCRing of the subset of frames, classifies text in each frame-OCR record, forms the redacted version of the screen-cast video, and stores the redacted version in memory;
the server-side application hosts screen-cast video for a plurality of tenants, each tenant having a respective policy specifying tenant-specific criteria for classifying text as confidential; and
the server-side application is configured to cause the redacted version of the screen-cast video to be streamed to another client computing device of user with which the screen-cast video is shared.

17. The medium of claim 1, wherein:
the screen-cast-capable client application determines amounts of difference between respective frames, selects the subset of frames, associates with each frame in the subset of frames respective indications of durations of time; and
a server-side application remote from the screen-cast-capable client application classifies text in each frame-OCR record, forms the redacted version of the screen-cast video, and stores the redacted version in memory.

18. The medium of claim 1, wherein causing OCRing of the subset of the frames comprises, for at least some of the subset of frames:
selecting sub-regions of respective frames that exclude toolbars of application user-interfaces displayed in the respective frames; and
causing OCRing of the sub-regions and not of regions displaying the excluded toolbars.

19. The medium of claim 18, wherein selecting the sub-regions comprises:

selecting the sub-regions with a convolutional neural network object-detection and localization model trained on a labeled training set of previous screen-cast videos in which regions of frames with toolbars are labeled.

20. The medium of claim 18, wherein selecting the sub-regions comprises:
selecting the sub-regions with an unsupervised object detection and localization model trained on past screen-cast videos.

21. The medium of claim 1, wherein:
classifying text in each frame-OCR record comprises steps for classifying text; and
the operations comprise steps for selectively providing access to the redacted version of the screen-cast video and the screen-cast video in unredacted form in different sessions based on roles or permissions.

22. A method, comprising:
obtaining, with one or more processors, screen-cast video of a display of a first user computing device captured by a screen-cast-capable client application executing on the first user computing device, the video comprising a plurality of frames in a sequence of frames, each frame depicting an image of the display at a corresponding time;
determining, with one or more processors, amounts of difference between respective frames and one or more frames that precede respective frames;
selecting, with one or more processors, a subset of frames from among the plurality of frames based on the subset of frames each having greater than a threshold amount of difference relative to one or more respective preceding frames;
associating, with one or more processors, with each frame in the subset of frames, respective indications of durations of time until a respective subsequent selected frame in the subset of frames;
causing, in response to the selection, with one or more processors, optical character recognition (OCRing) of each frame in the subset of frames and obtaining corresponding frame-OCR records, each frame-OCR record including text determined by the OCRing to be depicted in a corresponding frame and bounding areas determined by the OCRing indicating display coordinates of pixels depicting the text in the corresponding frame;
classifying, with one or more processors, text in each frame-OCR record as confidential or non-confidential; and
forming, with one or more processors, a redacted version of the screen-cast video by, for each frame having text classified as confidential:
determining bounding areas of the text classified as confidential based on the frame-OCR record corresponding to the respective frame having text classified as confidential;
determining a subsequence of frames within the duration of time associated with the respective frame having text classified as confidential; and
modifying, based on the determined bounding areas and the determined subsequence, pixel values in the bounding areas for each of the frames in the subsequence to redact the text classified as confidential in the respective frame and the subsequence of frames; and
storing, with one or more processors, the redacted version of the screen-cast video in memory.

* * * * *